(12) United States Patent
Zhou et al.

(10) Patent No.: US 10,638,483 B2
(45) Date of Patent: Apr. 28, 2020

(54) TECHNIQUES AND APPARATUSES FOR BEAM SWITCHING

(71) Applicant: QUALCOMM Incorporated, San Diego, CA (US)

(72) Inventors: Yan Zhou, San Diego, CA (US); Sumeeth Nagaraja, San Diego, CA (US); Makesh Pravin John Wilson, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/855,462

(22) Filed: Dec. 27, 2017

(65) Prior Publication Data

US 2019/0200337 A1 Jun. 27, 2019

(51) Int. Cl.
*H04W 72/04* (2009.01)
*H04L 5/00* (2006.01)
(Continued)

(52) U.S. Cl.
CPC ........ *H04W 72/046* (2013.01); *H04B 7/0617* (2013.01); *H04B 7/0695* (2013.01);
(Continued)

(58) Field of Classification Search
CPC . H04W 16/28; H04W 72/042; H04W 72/046; H04W 72/0413; H04W 72/0446;
(Continued)

(56) References Cited

U.S. PATENT DOCUMENTS 9,048,984 B2 * 6/2015 Yao .................. H04L 5/0037
10,027,456 B2 * 7/2018 Nagaraja ............... H04L 5/0048
(Continued)

FOREIGN PATENT DOCUMENTS

EP 3217721 A1 9/2017

OTHER PUBLICATIONS

Huawei et al., "NR Dual Connectivity between LF cell and HF cell", 3GPP Draft; R2-1705523, 3rd Generation Partnership Project (3GPP), Mobile Competence Centre, 650, Route Des Lucioles ; F-06921 Sophia-Antipolis Cedex, France, vol. RAN WG2, No. Hangzhou, China; May 15, 2017-May 19, 2017 May 14, 2017, XP051275882, Retrieved from the Internet: URL: http://www.3gpp.org/ftp/Meetings_3GPP_SYNC/RAN2/Docs/ [retrieved on May 14, 2017], 5 pages.
(Continued)

*Primary Examiner* — Tri H Phan
(74) *Attorney, Agent, or Firm* — Harrity & Harrity, LLP

(57) ABSTRACT

Various aspects of the present disclosure generally relate to wireless communication. In some aspects, a receiver may receive a beam switch command for a first link between the receiver and a transmitter, wherein the beam switch command is received via a second link between the receiver and the transmitter. The receiver may transmit an acknowledgement (ACK) corresponding to the beam switch command, wherein the ACK is transmitted via the second link. The receiver may perform a beam switch procedure on the first link based at least in part on transmitting the ACK via the second link. Numerous other aspects are provided.

30 Claims, 16 Drawing Sheets

(51) Int. Cl.
*H04B 7/06* (2006.01)
*H04B 7/08* (2006.01)
*H04B 7/024* (2017.01)

(52) U.S. Cl.
CPC .......... H04B 7/088 (2013.01); H04L 5/0055 (2013.01); H04W 72/0413 (2013.01); H04W 72/0446 (2013.01); H04W 72/0453 (2013.01); *H04B 7/024* (2013.01); *H04W 72/042* (2013.01)

(58) Field of Classification Search
CPC .................... H04W 72/0453; H04W 72/04; H04L 5/0055; H04L 5/00; H04B 7/0617; H04B 7/0619; H04B 7/0695; H04B 7/024; H04B 7/06; H04B 7/08; H04B 7/088
See application file for complete search history.

(56) References Cited

U.S. PATENT DOCUMENTS

| | | | |
|---|---|---|---|
| 10,123,322 B1* | 11/2018 | Nam | H04L 1/0038 |
| 10,159,075 B2* | 12/2018 | Ramamurthi | H04W 24/10 |
| 10,181,891 B2* | 1/2019 | Islam | H01Q 1/245 |
| 10,250,369 B2* | 4/2019 | Nagaraja | H04L 5/0048 |
| 10,257,070 B2* | 4/2019 | Zhang | H04L 43/16 |
| 10,327,154 B2* | 6/2019 | Nagaraja | H04L 5/0053 |
| 2017/0346544 A1* | 11/2017 | Islam | H04W 74/085 |
| 2018/0279287 A1* | 9/2018 | John Wilson | H04W 72/046 |

OTHER PUBLICATIONS

International Search Report and Written Opinion—PCT/US2018/067354—ISA/EPO—dated May 14, 2019.
Qualcomm Incorporated: "Remaining Details on QCL", 3GPP Draft, 3GPP TSG RAN WG1 Meeting #91, R1-1720672, 3rd Generation Partnership Project (3GPP), Mobile Competence Centre, 650, Route Des Lucioles, F-06921 Sophia-Antipolis Cedex, France, vol. RAN WG1, No. Reno, Nevada, USA; Nov. 27, 2017-Dec. 1, 2017, Nov. 18, 2017 (Nov. 18, 2017), XP051370133, pp. 1-9, Retrieved from the Internet: URL: http://www.3gpp.org/ftp/tsg_ran/WG1_RL1/TSGR1_91/Docs/ [retrieved on Nov. 18, 2017] sections 1-3.

* cited by examiner

TECHNIQUES AND APPARATUSES FOR BEAM SWITCHING

TECHNICAL FIELD OF THE DISCLOSURE

Aspects of the technology described below generally relate to wireless communication, and more particularly to techniques and apparatuses for beam switching. Embodiments and techniques enable and provide wireless communication devices and systems configured for low latency scenarios and enhance network coverage.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some aspects, a method of wireless communication, performed by a receiver, may include receiving a beam switch command for a first link between the receiver and a transmitter, wherein the beam switch command is received via a second link between the receiver and the transmitter; transmitting an acknowledgement (ACK) corresponding to the beam switch command, wherein the ACK is transmitted via the second link; and performing a beam switch procedure on the first link based at least in part on transmitting the ACK via the second link.

In some aspects, a receiver for wireless communication may include memory and one or more processors operatively coupled to the memory. The memory and the one or more processors may be configured to receive a beam switch command for a first link between the receiver and a transmitter, wherein the beam switch command is received via a second link between the receiver and the transmitter; transmit an acknowledgement (ACK) corresponding to the beam switch command, wherein the ACK is transmitted via the second link; and perform a beam switch procedure on the first link based at least in part on transmitting the ACK via the second link.

In some aspects, a non-transitory computer-readable medium may store one or more instructions for wireless communication. The one or more instructions, when executed by one or more processors of a receiver, may cause the one or more processors to receive a beam switch command for a first link between the receiver and a transmitter, wherein the beam switch command is received via a second link between the receiver and the transmitter; transmit an acknowledgement (ACK) corresponding to the beam switch command, wherein the ACK is transmitted via the second link; and perform a beam switch procedure on the first link based at least in part on transmitting the ACK via the second link.

In some aspects, a receiver (e.g., an apparatus) for wireless communication may include means for receiving a beam switch command for a first link between the receiver and a transmitter, wherein the beam switch command is received via a second link between the receiver and the transmitter; means for transmitting an acknowledgement (ACK) corresponding to the beam switch command, wherein the ACK is transmitted via the second link; and means for performing a beam switch procedure on the first link based at least in part on transmitting the ACK via the second link.

In some aspects, a method of wireless communication, performed by a transmitter, may include transmitting a beam switch command for a first link between a receiver and the transmitter, wherein the beam switch command is transmitted via a second link between the receiver and the transmitter; receiving an acknowledgement (ACK) corresponding to the beam switch command, wherein the ACK is received via the second link; and performing a beam switch procedure on the first link based at least in part on receiving the ACK via the second link.

In some aspects, a transmitter for wireless communication may include memory and one or more processors operatively coupled to the memory. The memory and the one or more processors may be configured to transmit a beam switch command for a first link between a receiver and the transmitter, wherein the beam switch command is transmitted via a second link between the receiver and the transmitter; receive an acknowledgement (ACK) corresponding to the beam switch command, wherein the ACK is received via the second link; and perform a beam switch procedure on the first link based at least in part on receiving the ACK via the second link.

In some aspects, a non-transitory computer-readable medium may store one or more instructions for wireless communication. The one or more instructions, when executed by one or more processors of a transmitter, may cause the one or more processors to transmit a beam switch command for a first link between a receiver and the transmitter, wherein the beam switch command is transmitted via a second link between the receiver and the transmitter; receive an acknowledgement (ACK) corresponding to the beam switch command, wherein the ACK is received via the second link; and perform a beam switch procedure on the first link based at least in part on receiving the ACK via the second link.

In some aspects, a transmitter (e.g., an apparatus) for wireless communication may include means for transmitting a beam switch command for a first link between a receiver and the transmitter, wherein the beam switch command is transmitted via a second link between the receiver and the transmitter; means for receiving an acknowledgement (ACK) corresponding to the beam switch command, wherein the ACK is received via the second link; and means for performing a beam switch procedure on the first link based at least in part on receiving the ACK via the second link.

In some aspects, a method of wireless communication, performed by a receiver, may include receiving downlink control information (DCI) that indicates one or more resources for transmission of acknowledgement or negative acknowledgement (ACK/NACK) feedback corresponding to a beam switch command for a first link between the receiver and a transmitter, wherein the DCI is received via a second link between the receiver and the transmitter; receiving the beam switch command; and transmitting the ACK/NACK feedback, corresponding to the beam switch command, using the one or more resources indicated in the DCI received via the second link.

In some aspects, a receiver for wireless communication may include memory and one or more processors operatively coupled to the memory. The memory and the one or more processors may be configured to receive downlink control information (DCI) that indicates one or more resources for transmission of acknowledgement or negative acknowledgement (ACK/NACK) feedback corresponding to a beam switch command for a first link between the receiver and a transmitter, wherein the DCI is received via a second link between the receiver and the transmitter; receive the beam switch command; and transmit the ACK/NACK feedback, corresponding to the beam switch command, using the one or more resources indicated in the DCI received via the second link.

In some aspects, a non-transitory computer-readable medium may store one or more instructions for wireless communication. The one or more instructions, when executed by one or more processors of a receiver, may cause the one or more processors to receive downlink control information (DCI) that indicates one or more resources for transmission of acknowledgement or negative acknowledgement (ACK/NACK) feedback corresponding to a beam switch command for a first link between the receiver and a transmitter, wherein the DCI is received via a second link between the receiver and the transmitter; receive the beam switch command; and transmit the ACK/NACK feedback, corresponding to the beam switch command, using the one or more resources indicated in the DCI received via the second link.

In some aspects, a receiver (e.g., an apparatus) for wireless communication may include means for receiving downlink control information (DCI) that indicates one or more resources for transmission of acknowledgement or negative acknowledgement (ACK/NACK) feedback corresponding to a beam switch command for a first link between the receiver and a transmitter, wherein the DCI is received via a second link between the receiver and the transmitter; means for receiving the beam switch command; and means for transmitting the ACK/NACK feedback, corresponding to the beam switch command, using the one or more resources indicated in the DCI received via the second link.

In some aspects, a method of wireless communication, performed by a transmitter, may include transmitting downlink control information (DCI) that indicates one or more resources for transmission of acknowledgement or negative acknowledgement (ACK/NACK) feedback corresponding to a beam switch command for a first link between a receiver and the transmitter, wherein the DCI is transmitted via a second link between the receiver and the transmitter; transmitting the beam switch command; and receiving the ACK/NACK feedback, corresponding to the beam switch command, via the one or more resources indicated in the DCI transmitted via the second link.

In some aspects, a transmitter for wireless communication may include memory and one or more processors operatively coupled to the memory. The memory and the one or more processors may be configured to transmit downlink control information (DCI) that indicates one or more resources for transmission of acknowledgement or negative acknowledgement (ACK/NACK) feedback corresponding to a beam switch command for a first link between a receiver and the transmitter, wherein the DCI is transmitted via a second link between the receiver and the transmitter; transmit the beam switch command; and receive the ACK/NACK feedback, corresponding to the beam switch command, via the one or more resources indicated in the DCI transmitted via the second link.

In some aspects, a non-transitory computer-readable medium may store one or more instructions for wireless communication. The one or more instructions, when executed by one or more processors of a transmitter, may cause the one or more processors to transmit downlink control information (DCI) that indicates one or more resources for transmission of acknowledgement or negative acknowledgement (ACK/NACK) feedback corresponding to a beam switch command for a first link between a receiver and the transmitter, wherein the DCI is transmitted via a second link between the receiver and the transmitter; transmit the beam switch command; and receive the ACK/NACK feedback, corresponding to the beam switch command, via the one or more resources indicated in the DCI transmitted via the second link.

In some aspects, a transmitter (e.g., an apparatus) for wireless communication may include means for transmitting downlink control information (DCI) that indicates one or more resources for transmission of acknowledgement or negative acknowledgement (ACK/NACK) feedback corresponding to a beam switch command for a first link between a receiver and the transmitter, wherein the DCI is transmitted via a second link between the receiver and the transmitter; means for transmitting the beam switch command; and means for receiving the ACK/NACK feedback, corresponding to the beam switch command, via the one or more resources indicated in the DCI transmitted via the second link.

In some aspects, a method of wireless communication, performed by a receiver, may include receiving a beam switch command from a transmitter, wherein the beam switch command includes at least one of: a first indication to switch from a first downlink beam pair to a second downlink beam pair, a second indication to switch from a first uplink beam pair to a second uplink beam pair, a third indication of a sequence of beam switches to be performed over a time period, or a fourth indication to switch beam pairs for a point of a coordinated multipoint communication; and performing a beam switch procedure based at least in part on the beam switch command.

In some aspects, a receiver for wireless communication may include memory and one or more processors operatively coupled to the memory. The memory and the one or more processors may be configured to receive a beam switch command from a transmitter, wherein the beam switch command includes at least one of: a first indication to switch from a first downlink beam pair to a second downlink beam pair, a second indication to switch from a first uplink beam pair to a second uplink beam pair, a third indication of a sequence of beam switches to be performed over a time period, or a fourth indication to switch beam pairs for a point of a coordinated multipoint communication; and perform a beam switch procedure based at least in part on the beam switch command.

In some aspects, a non-transitory computer-readable medium may store one or more instructions for wireless communication. The one or more instructions, when executed by one or more processors of a receiver, may cause the one or more processors to receive a beam switch command from a transmitter, wherein the beam switch command includes at least one of: a first indication to switch from a first downlink beam pair to a second downlink beam pair, a second indication to switch from a first uplink beam pair to a second uplink beam pair, a third indication of a sequence of beam switches to be performed over a time period, or a fourth indication to switch beam pairs for a point of a coordinated multipoint communication; and perform a beam switch procedure based at least in part on the beam switch command.

In some aspects, a receiver (e.g., an apparatus) for wireless communication may include means for receiving a beam switch command from a transmitter, wherein the beam switch command includes at least one of: a first indication to switch from a first downlink beam pair to a second downlink beam pair, a second indication to switch from a first uplink beam pair to a second uplink beam pair, a third indication of a sequence of beam switches to be performed over a time period, or a fourth indication to switch beam pairs for a point of a coordinated multipoint communication; and means for performing a beam switch procedure based at least in part on the beam switch command.

In some aspects, a method of wireless communication, performed by a transmitter, may include transmitting a beam switch command to a receiver, wherein the beam switch command includes at least one of: a first indication to switch from a first downlink beam pair to a second downlink beam pair, a second indication to switch from a first uplink beam pair to a second uplink beam pair, a third indication of a sequence of beam switches to be performed over a time period, or a fourth indication to switch beam pairs for a point of a coordinated multipoint communication; and performing a beam switch procedure based at least in part on the beam switch command.

In some aspects, a transmitter for wireless communication may include memory and one or more processors operatively coupled to the memory. The memory and the one or more processors may be configured to transmit a beam switch command to a receiver, wherein the beam switch command includes at least one of: a first indication to switch from a first downlink beam pair to a second downlink beam pair, a second indication to switch from a first uplink beam pair to a second uplink beam pair, a third indication of a sequence of beam switches to be performed over a time period, or a fourth indication to switch beam pairs for a point of a coordinated multipoint communication; and perform a beam switch procedure based at least in part on the beam switch command.

In some aspects, a non-transitory computer-readable medium may store one or more instructions for wireless communication. The one or more instructions, when executed by one or more processors of a transmitter, may cause the one or more processors to transmit a beam switch command to a receiver, wherein the beam switch command includes at least one of: a first indication to switch from a first downlink beam pair to a second downlink beam pair, a second indication to switch from a first uplink beam pair to a second uplink beam pair, a third indication of a sequence of beam switches to be performed over a time period, or a fourth indication to switch beam pairs for a point of a coordinated multipoint communication; and perform a beam switch procedure based at least in part on the beam switch command.

In some aspects, a transmitter (e.g., an apparatus) for wireless communication may include means for transmitting a beam switch command to a receiver, wherein the beam switch command includes at least one of: a first indication to switch from a first downlink beam pair to a second downlink beam pair, a second indication to switch from a first uplink beam pair to a second uplink beam pair, a third indication of a sequence of beam switches to be performed over a time period, or a fourth indication to switch beam pairs for a point of a coordinated multipoint communication; and means for performing a beam switch procedure based at least in part on the beam switch command.

In some aspects, a method of wireless communication, performed by a receiver, may include receiving, from a transmitter, a beam switch command to switch away from a first beam pair, wherein the beam switch command identifies a second beam pair; determining that the second beam pair is not to be used; and performing a beam switch procedure to switch from the first beam pair to a third beam pair based at least in part on determining that the second beam pair is not to be used.

In some aspects, a receiver for wireless communication may include memory and one or more processors operatively coupled to the memory. The memory and the one or more processors may be configured to receive, from a transmitter, a beam switch command to switch away from a first beam pair, wherein the beam switch command identifies a second beam pair; determine that the second beam pair is not to be used; and perform a beam switch procedure to switch from the first beam pair to a third beam pair based at least in part on determining that the second beam pair is not to be used.

In some aspects, a non-transitory computer-readable medium may store one or more instructions for wireless communication. The one or more instructions, when executed by one or more processors of a receiver, may cause the one or more processors to receive, from a transmitter, a beam switch command to switch away from a first beam pair, wherein the beam switch command identifies a second beam pair; determine that the second beam pair is not to be used; and perform a beam switch procedure to switch from the first beam pair to a third beam pair based at least in part on determining that the second beam pair is not to be used.

In some aspects, a receiver (e.g., an apparatus) for wireless communication may include means for receiving, from a transmitter, a beam switch command to switch away from a first beam pair, wherein the beam switch command identifies a second beam pair; means for determining that the second beam pair is not to be used; and means for performing a beam switch procedure to switch from the first beam pair to a third beam pair based at least in part on determining that the second beam pair is not to be used.

In some aspects, a method of wireless communication, performed by a transmitter, may include transmitting, to a receiver, a beam switch command to switch away from a first beam pair, wherein the beam switch command identifies a second beam pair; receiving an indication that the second beam pair is not to be used; and performing a beam switch procedure to switch from the first beam pair to a third beam pair based at least in part on receiving the indication that the second beam pair is not to be used.

In some aspects, a transmitter for wireless communication may include memory and one or more processors operatively coupled to the memory. The memory and the one or more processors may be configured to transmit, to a receiver, a beam switch command to switch away from a first beam pair, wherein the beam switch command identifies a second beam pair; receive an indication that the second beam pair is not to be used; and perform a beam switch procedure to switch from the first beam pair to a third beam pair based at least in part on receiving the indication that the second beam pair is not to be used.

In some aspects, a non-transitory computer-readable medium may store one or more instructions for wireless communication. The one or more instructions, when executed by one or more processors of a transmitter, may cause the one or more processors to transmit, to a receiver, a beam switch command to switch away from a first beam pair, wherein the beam switch command identifies a second beam pair; receive an indication that the second beam pair is not to be used; and perform a beam switch procedure to switch from the first beam pair to a third beam pair based at least in part on receiving the indication that the second beam pair is not to be used.

In some aspects, a transmitter (e.g., an apparatus) for wireless communication may include means for transmitting, to a receiver, a beam switch command to switch away from a first beam pair, wherein the beam switch command identifies a second beam pair; means for receiving an indication that the second beam pair is not to be used; and means for performing a beam switch procedure to switch from the first beam pair to a third beam pair based at least in part on receiving the indication that the second beam pair is not to be used.

Aspects generally include a method, apparatus, system, computer program product, non-transitory computer-readable medium, user equipment, base station, receiver, transmitter, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
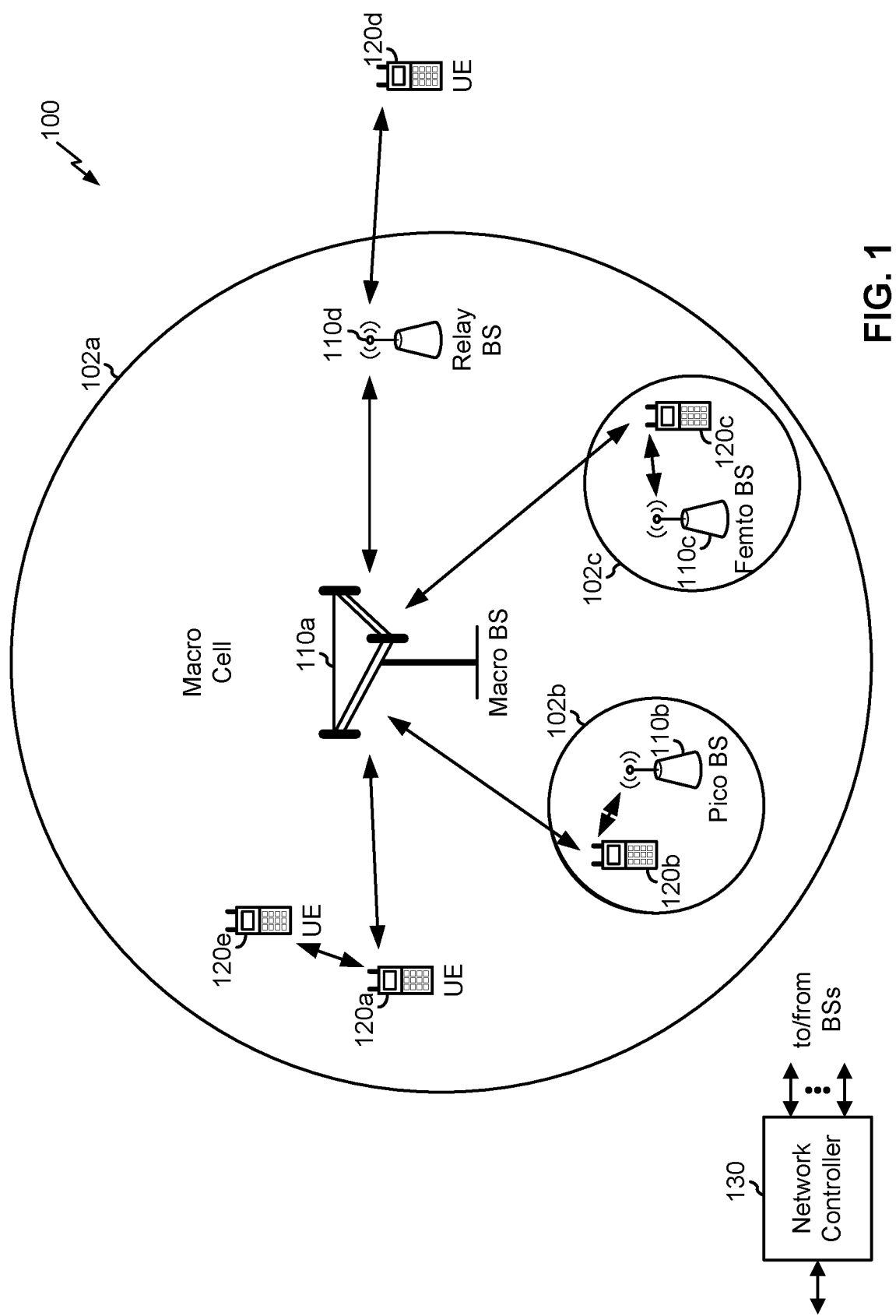
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 1 is provided merely as an example. Other examples are possible and may differ from what was described with regard to FIG. 1.

Figure 2:
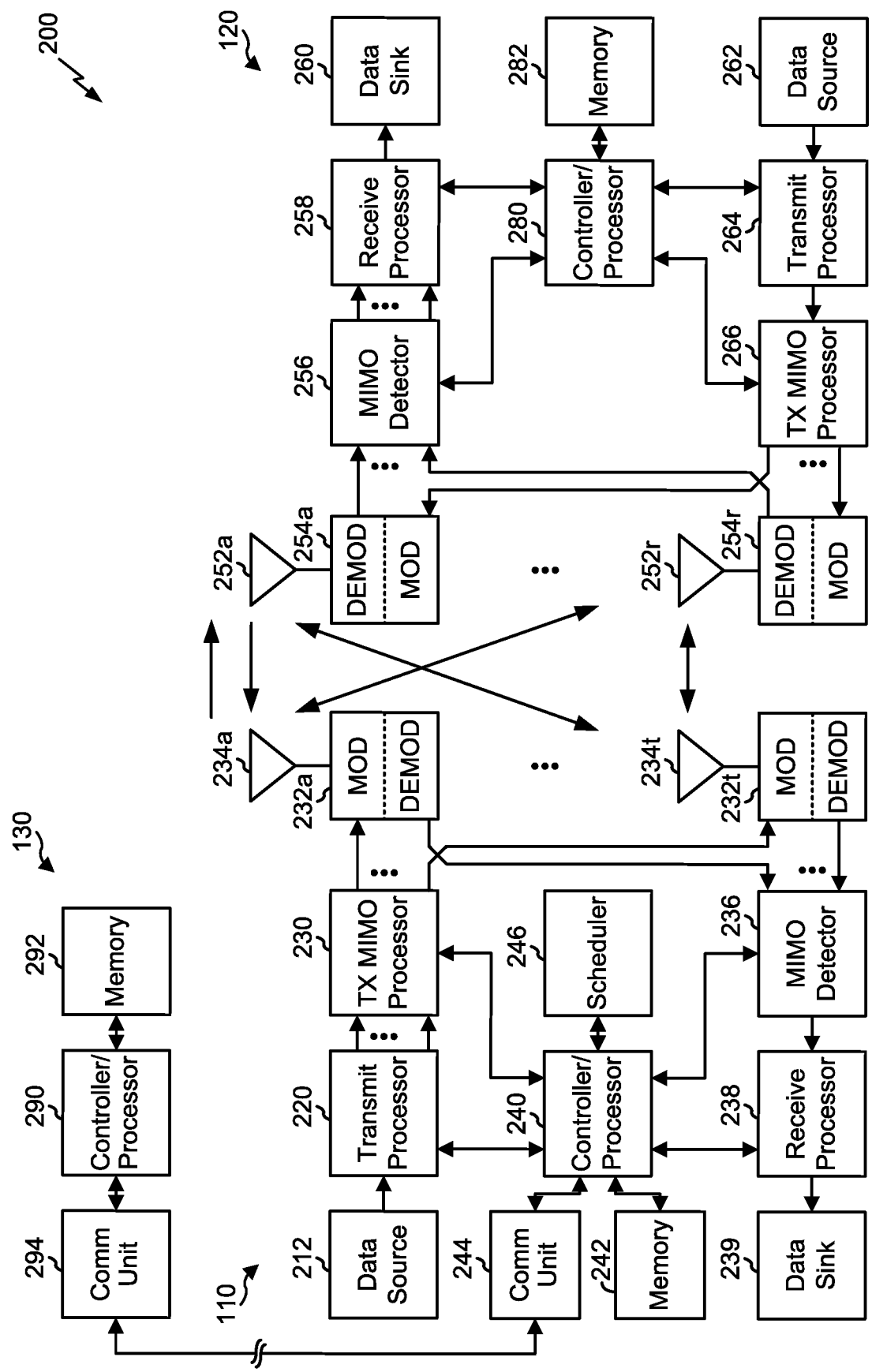
FIG. 2 is a block diagram conceptually illustrating an example of a base station in communication with a user equipment (UE) in a wireless communication network, in accordance with various aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream.

Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), signal to interference plus noise ratio (SINR), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with beam switching, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, process 1200 of FIG. 12, process 1300 of FIG. 13, process 1400 of FIG. 14, process 1500 of FIG. 15, process 1600 of FIG. 16, and/or other processes as described herein. Memories 242 and 282 may store data and program codes for base station 110 and UE 120, respectively. A scheduler 246 may schedule UEs for data transmission on the downlink and/or uplink.

In some aspects, UE 120 and/or base station 110 may include means for receiving a beam switch command for a first link between a receiver and a transmitter, wherein the beam switch command is received via a second link between the receiver and the transmitter; means for transmitting an acknowledgement (ACK) corresponding to the beam switch command, wherein the ACK is transmitted via the second link; means for performing a beam switch procedure on the first link based at least in part on transmitting the ACK via the second link; and/or the like. Additionally, or alternatively, UE 120 and/or base station 110 may include means for transmitting a beam switch command for a first link between a receiver and a transmitter, wherein the beam switch command is transmitted via a second link between the receiver and the transmitter; means for receiving an acknowledgement (ACK) corresponding to the beam switch command, wherein the ACK is received via the second link; means for performing a beam switch procedure on the first link based at least in part on receiving the ACK via the second link; and/or the like. In some aspects, such means may include one or more components of UE 120 and/or base station 110 described in connection with FIG. 2.

Additionally, or alternatively, UE 120 and/or base station 110 may include means for receiving downlink control information (DCI) that indicates one or more resources for transmission of acknowledgement or negative acknowledgement (ACK/NACK) feedback corresponding to a beam switch command for a first link between a receiver and a transmitter, wherein the DCI is received via a second link between the receiver and the transmitter; means for receiving the beam switch command; means for transmitting the ACK/NACK feedback, corresponding to the beam switch command, using the one or more resources indicated in the DCI received via the second link; and/or the like. Additionally, or alternatively, UE 120 and/or base station 110 may include means for transmitting downlink control information (DCI) that indicates one or more resources for transmission of acknowledgement or negative acknowledgement (ACK/NACK) feedback corresponding to a beam switch command for a first link between a receiver and a transmitter, wherein the DCI is transmitted via a second link between the receiver and the transmitter; means for transmitting the beam switch command; means for receiving the ACK/NACK feedback, corresponding to the beam switch command, via the one or more resources indicated in the DCI transmitted via the second link; and/or the like. In some aspects, such means may include one or more components of UE 120 and/or base station 110 described in connection with FIG. 2.

Additionally, or alternatively, UE 120 and/or base station 110 may include means for receiving a beam switch command from a transmitter, wherein the beam switch command includes at least one of: a first indication to switch from a first downlink beam pair to a second downlink beam pair, a second indication to switch from a first uplink beam pair to a second uplink beam pair, a third indication of a sequence of beam switches to be performed over a time period, or a fourth indication to switch beam pairs for a point of a coordinated multipoint communication; means for performing a beam switch procedure based at least in part on the beam switch command; and/or the like. Additionally, or alternatively, UE 120 and/or base station 110 may include means for transmitting a beam switch command to a receiver, wherein the beam switch command includes at least one of: a first indication to switch from a first downlink beam pair to a second downlink beam pair, a second indication to switch from a first uplink beam pair to a second uplink beam pair, a third indication of a sequence of beam switches to be performed over a time period, or a fourth indication to switch beam pairs for a point of a coordinated multipoint communication; means for performing a beam switch procedure based at least in part on the beam switch command; and/or the like. In some aspects, such means may include one or more components of UE 120 and/or base station 110 described in connection with FIG. 2.

Additionally, or alternatively, UE 120 and/or base station 110 may include means for receiving, from a transmitter, a beam switch command to switch away from a first beam pair, wherein the beam switch command identifies a second beam pair; means for determining that the second beam pair is not to be used; means for performing a beam switch procedure to switch from the first beam pair to a third beam pair based at least in part on determining that the second beam pair is not to be used; and/or the like. Additionally, or alternatively, UE 120 and/or base station 110 may include means for transmitting, to a receiver, a beam switch command to switch away from a first beam pair, wherein the beam switch command identifies a second beam pair; means for receiving an indication that the second beam pair is not to be used; means for performing a beam switch procedure to switch from the first beam pair to a third beam pair based at least in part on receiving the indication that the second beam pair is not to be used; and/or the like. In some aspects, such means may include one or more components of UE 120 and/or base station 110 described in connection with FIG. 2.

As indicated above, FIG. 2 is provided merely as an example. Other examples are possible and may differ from what was described with regard to FIG. 2.

Figure 3:
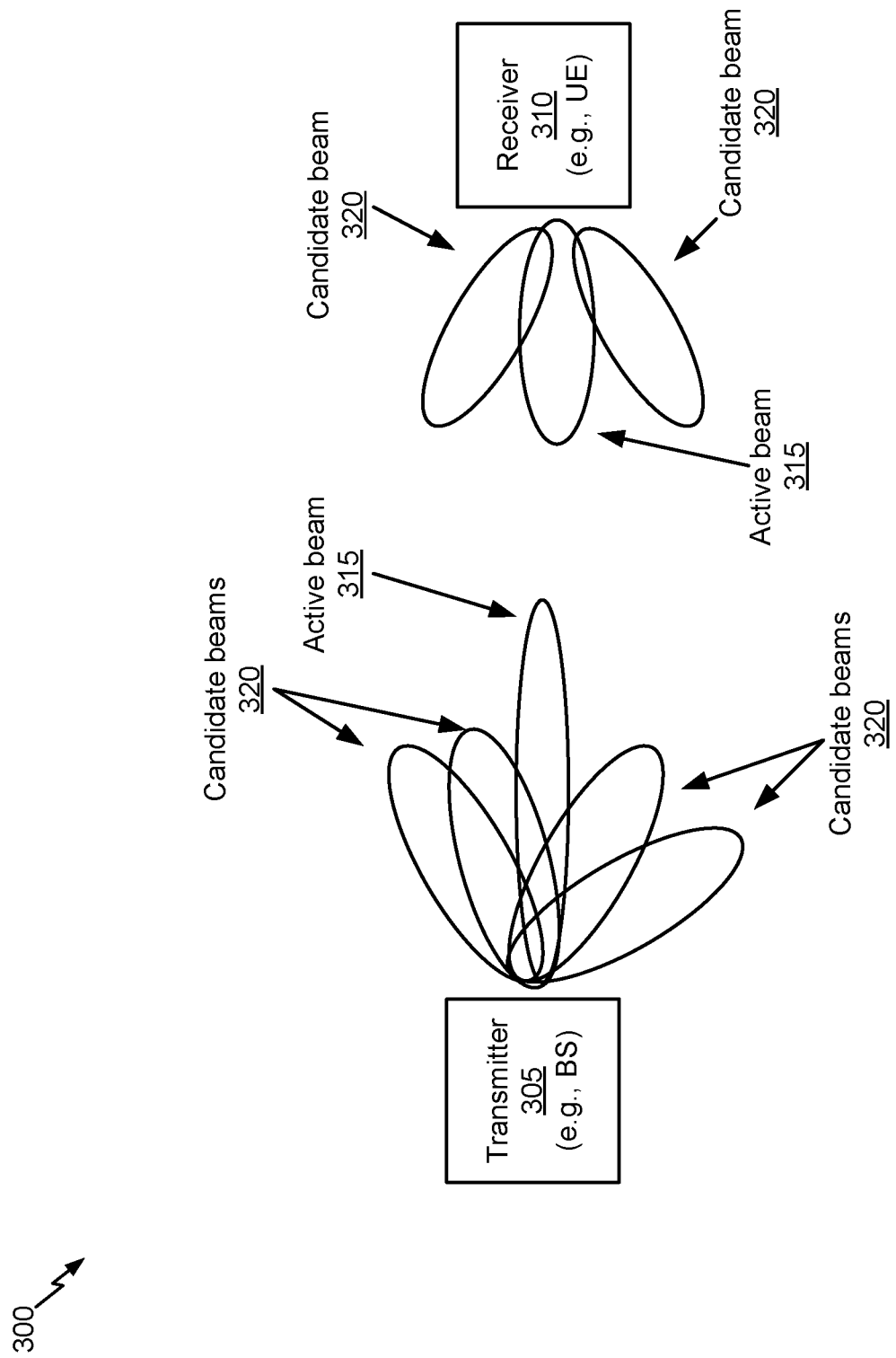
FIGS. 3-8 are diagrams illustrating examples relating to beam switching, in accordance with various aspects of the present disclosure.

FIG. 3 is a diagram illustrating an example 300 relating to beam switching, in accordance with various aspects of the present disclosure. FIG. 3 shows an example of wireless communication via one or more beams.

As shown in FIG. 3, a transmitter 305 (e.g., shown as a base station in example 300, such as the base station 110) may communicate with a receiver 310 (e.g., shown as a UE in example 300, such as the UE 120) using one or more active beams 315. In some aspects, the transmitter 305 and the receiver 310 may also be capable of communicating via one or more candidate beams 320. In some aspects, an active beam 315 may be selected from a set of candidate beams 320 by comparing beam parameters (e.g., reference signal received power (RSRP), reference signal received quality (RSRQ), a received signal strength indicator (RSSI), and/or the like) of the set of candidate beams 320. For example, an active beam 315 may be the beam that has the best beam parameters among all beams in the set of candidate beams 320. In some aspects, the beams may operate in a millimeter wave radio frequency band.

In some aspects, if the active beam 315 experiences a failure, or network conditions change such that another candidate beam 320 has one or more better beam parameters than the active beam 315, then the transmitter 305 and the receiver 310 may perform a beam switch procedure to switch away from the active beam 315 and to a candidate beam 320. After switching beams, the transmitter 305 and the receiver 310 may no longer communicate via the previously active beam, and may communicate via the newly activated candidate beam (e.g., which becomes the active beam).

In some aspects, to switch away from an active beam 315, the transmitter 305 may transmit a beam switch command to instruct the receiver 310 to switch beams. The beam switch command may indicate, for example, a beam index for a beam to be activated, a timing for the switch, and/or the like. However, in some cases, the receiver 310 may fail to receive the beam switch command via the active beam 315, especially if the beam switch command is being transmitted due to a degradation of one or more beam parameters of the active beam 315.

In some aspects, the transmitter 305 and the receiver 310 may be capable of communicating via a first link that uses beams (e.g., a millimeter wave link) and a second link that does not use beams (e.g., a sub-6 GHz link). In some aspects, the first link may be referred to as an in-band link, and the second link may be referred to as an out-of-band link. To improve reliability, reduce latency, conserve network and/or computing resources, and/or the like, the beam switch command, instructing the receiver 310 to switch beams on the first link, may be communicated via the second link. Some techniques and apparatuses described herein improve reliability, latency, resource usage, and/or the like when performing beam switching, particularly when using an out-of-band link to assist with beam switching.

As indicated above, FIG. 3 is provided as an example. Other examples are possible and may differ from what was described with respect to FIG. 3.

Figure 4:
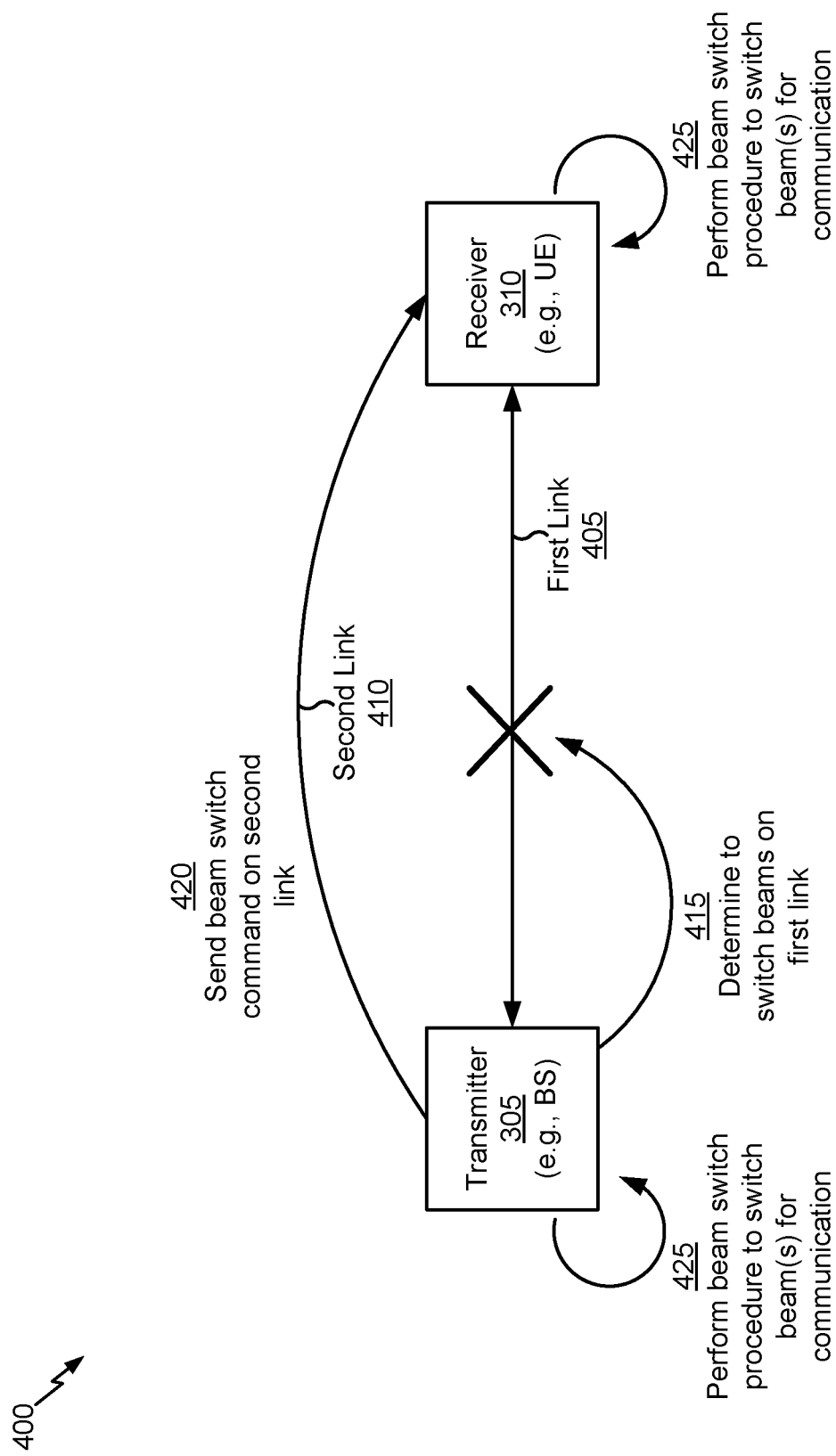

FIG. 4 is a diagram illustrating an example 400 relating to beam switching, in accordance with various aspects of the present disclosure.

As shown in FIG. 4, a transmitter 305 and a receiver 310 may be capable of communicating via a first link 405 and a second link 410. In some aspects, the transmitter 305 and/or the receiver 310 may include a UE (e.g., the UE 120), a base station (e.g., the base station 110), and/or the like. For example, the transmitter 305 may include a base station 110, and the receiver 310 may include a UE 120. As another example, the transmitter 305 may include a first base station 110, and the receiver 310 may include a second base station 110. As another example, the transmitter 305 may include a first UE 120, and the receiver 310 may include a second UE 120. As another example, the transmitter 305 may include a UE 120, and the receiver 310 may include a base station 110.

As shown by reference number 415, the transmitter 305 may determine to switch beams on the first link 405 between the transmitter 305 and the receiver 310. In some aspects, the first link 405 is a link that supports beamforming, such as a millimeter wave link (e.g., a link in the millimeter wave frequency band) and/or the like. In some aspects, the transmitter 305 may determine to switch beams due to a failure of an active beam, a beam parameter of the active beam failing to satisfy a threshold, a beam parameter of a candidate beam (e.g., that is not the active beam) satisfying a threshold, a beam switch request from the receiver 310, and/or the like.

As shown by reference number 420, the transmitter 305 may transmit, via the second link 410, a beam switch command to switch beams on the first link 405. The second link 410 may include, for example, a wireless link, a wired link, or some combination thereof. In some aspects, the second link 410 is a link that does not support beamforming, such as a sub-6 GHz link (e.g., a link in the sub-6 GHz frequency band) and/or the like. In some aspects, the first link 405 and the second link 410 use different frequency bands. For example, the first link 405 may use a millimeter wave frequency band, and the second link 410 may use a sub-6 gigahertz (GHz) frequency band (e.g., for increased reliability). In some aspects, the second link 410 is an ultra-reliable low latency communication (URLLC) link.

As shown by reference number 425, the transmitter 305 and the receiver 310 may perform a beam switch procedure to switch beams (e.g., from an old active beam to a new active beam) for communication between the transmitter 305 and the receiver 310. The beam switch command may indicate, for example, a beam index for a beam to be activated, a timing for the switch, and/or the like, and the transmitter 305 and the receiver 310 may perform the beam switch procedure according to the information in the beam switch command.

By using an out-of-band link to communicate the beam switch command, reliability, latency, resource usage, and/or the like, associated with beam switching, may be improved. However, in some cases, using the out-of-band link may introduce difficulties associated with, for example, communicating an acknowledgement (ACK) or a negative acknowledgement (NACK) corresponding to the out-of-band beam switch command, scheduling the ACK or NACK, using a beam switch command that includes a large amount of information, negotiating a beam switch, and/or the like. Some techniques and apparatuses described herein address these difficulties, and improve reliability, latency, resource usage, and/or the like associated with beam switching.

As indicated above, FIG. 4 is provided as an example. Other examples are possible and may differ from what was described with respect to FIG. 4.

Figure 5:
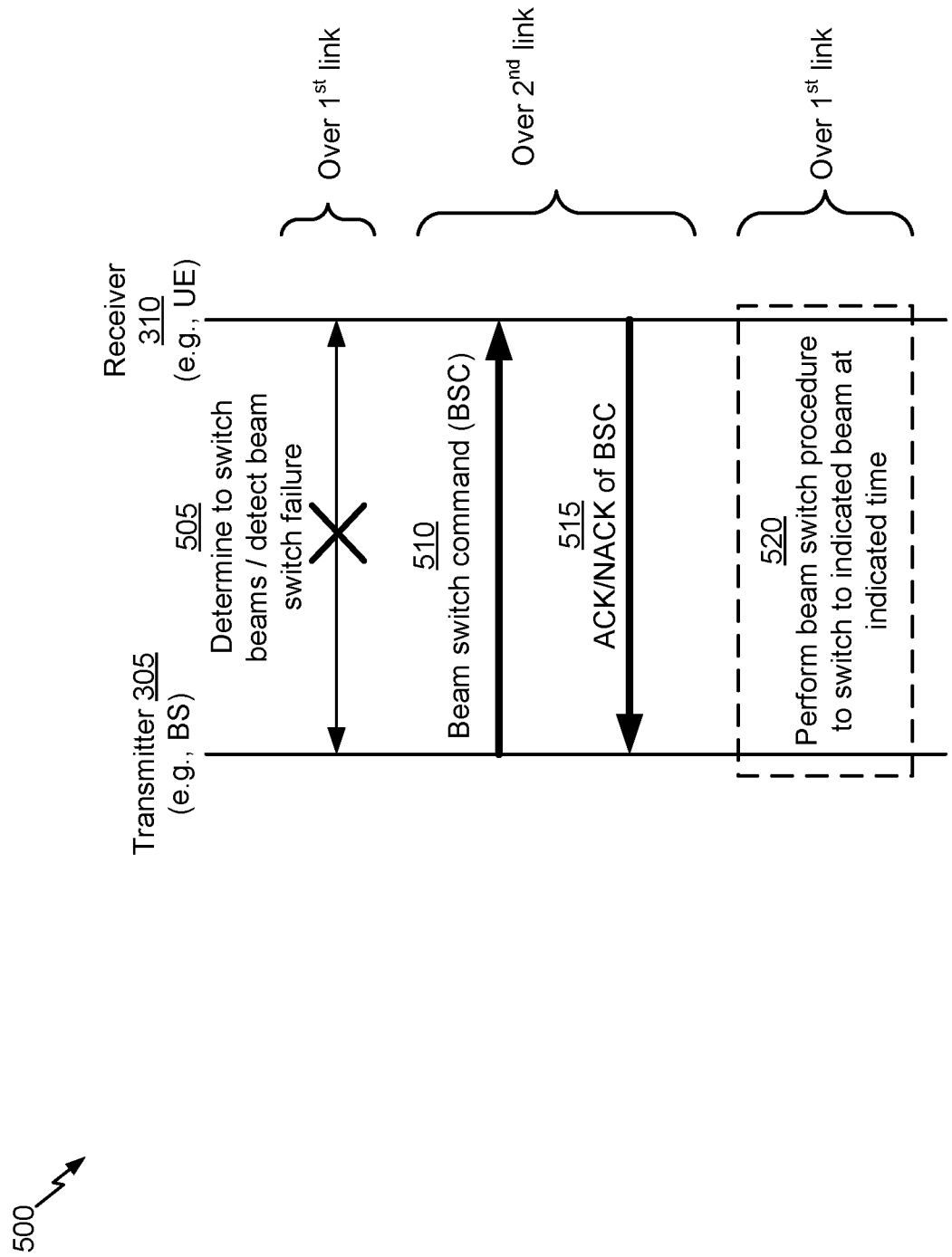

FIG. 5 is a diagram illustrating an example 500 relating to beam switching, in accordance with various aspects of the present disclosure.

As shown by reference number 505, a transmitter 305 may determine to switch beams on a first link between the transmitter 305 and a receiver 310. In some aspects, the transmitter 305 may determine to switch beams due to a failure of an active beam, a beam parameter of the active beam failing to satisfy a threshold, a beam parameter of a candidate beam (e.g., that is not the active beam) satisfying a threshold, a beam switch request from the receiver 310, and/or the like. In some aspects, the transmitter 305 may transmit a beam switch command on the first link, and may detect a beam switch failure. For example, a beam switch procedure may fail due to the beam switch command not being received by the receiver 310 over the first link, due to an ACK or a NACK of the beam switch command not being received by the transmitter 305 over the first link, and/or the like.

As shown by reference number 510, the transmitter 305 may transmit, via a second link between the transmitter 305 and the receiver 310, a beam switch command for the first link. The receiver 310 may receive the beam switch command via the second link. In some aspects, the beam switch command may be included in a radio resource control (RRC) configuration message, a media access control (MAC) control element (CE) of a packet, and/or the like.

In some aspects, the beam switch command may indicate a beam to be activated, a timing for activating the beam and/or performing the beam switch, and/or the like. Additionally, or alternatively, the beam switch command may include a first indication to switch from a first downlink beam pair to a second downlink beam pair on the first link, a second indication to switch from a first uplink beam pair to a second uplink beam pair on the first link, a third indication of a sequence of beam switches to be performed over a time period on the first link, a fourth indication to switch beam pairs for a point of a coordinated multipoint communication on the first link, and/or the like, as described in more detail below in connection with FIG. 7. In some aspects, the beam switch command may include information for negotiating a beam switch, as described in more detail below in connection with FIG. 8.

As shown by reference number 515, the receiver 310 may transmit, via the second link, an ACK corresponding to the beam switch command. The transmitter 305 may receive the ACK via the second link. In some aspects, such as when the beam switch command is included in an RRC configuration message, the ACK may acknowledge receipt of the RRC configuration message. In some aspects, such as when the beam switch command is included in a MAC CE of a packet, the ACK may acknowledge receipt of the packet.

In some aspects, the receiver 310 may fail to properly receive the beam switch command. In this case, the receiver 310 may transmit a NACK, corresponding to the beam switch command, via the second link. The transmitter 305 may receive the NACK via the second link, and may retransmit the beam switch command via the second link. The receiver 310 may receive the retransmission of the beam switch command via the second link. If properly received, the receiver 310 may transmit an ACK, via the second link, corresponding to the beam switch command (e.g., the retransmission of the beam switch command). If not properly received, the receiver 310 may transmit another NACK, via the second link, and the transmitter 305 and the receive 310 may continue to communicate in this manner until the beam switch command is successfully received and acknowledged by the receiver 310.

In some aspects, one or more resources for communicating the ACK or the NACK (e.g., ACK/NACK feedback) may be scheduled based at least in part on downlink control information (DCI) communicated via the second link. In some aspects, the DCI may be communicated in the same packet as the beam switch command. In some aspects, the DCI may be communicated in a different packet than the beam switch command. In this way, the reliability of scheduling ACK/NACK feedback corresponding to the beam switch command may be improved. Additional details regarding scheduling ACK/NACK feedback are described below in connection with FIG. 6.

As shown by reference number 520, the transmitter 305 and the receiver 310 may perform a beam switch procedure on the first link based at least in part on the beam switch command and/or the ACK. For example, based at least in part on transmitting the ACK, the receiver 310 may switch to a beam indicated in the beam switch command at a time indicated in the beam switch command. Similarly, based at least in part on receiving the ACK, the transmitter 305 may switch to a beam indicated in the beam switch command at a time indicated in the beam switch command.

As described above in connection with FIG. 4, in some aspects, the first link uses a first frequency band and the second link uses a second frequency band. For example, the first frequency band may be a millimeter wave frequency band, and the second frequency band may be a sub-6 gigahertz frequency band. In this way, the beam switch command and/or the ACK may be communicated via the second link with improved reliability as compared to the first link.

As indicated above, FIG. 5 is provided as an example. Other examples are possible and may differ from what was described with respect to FIG. 5.

Figure 6:
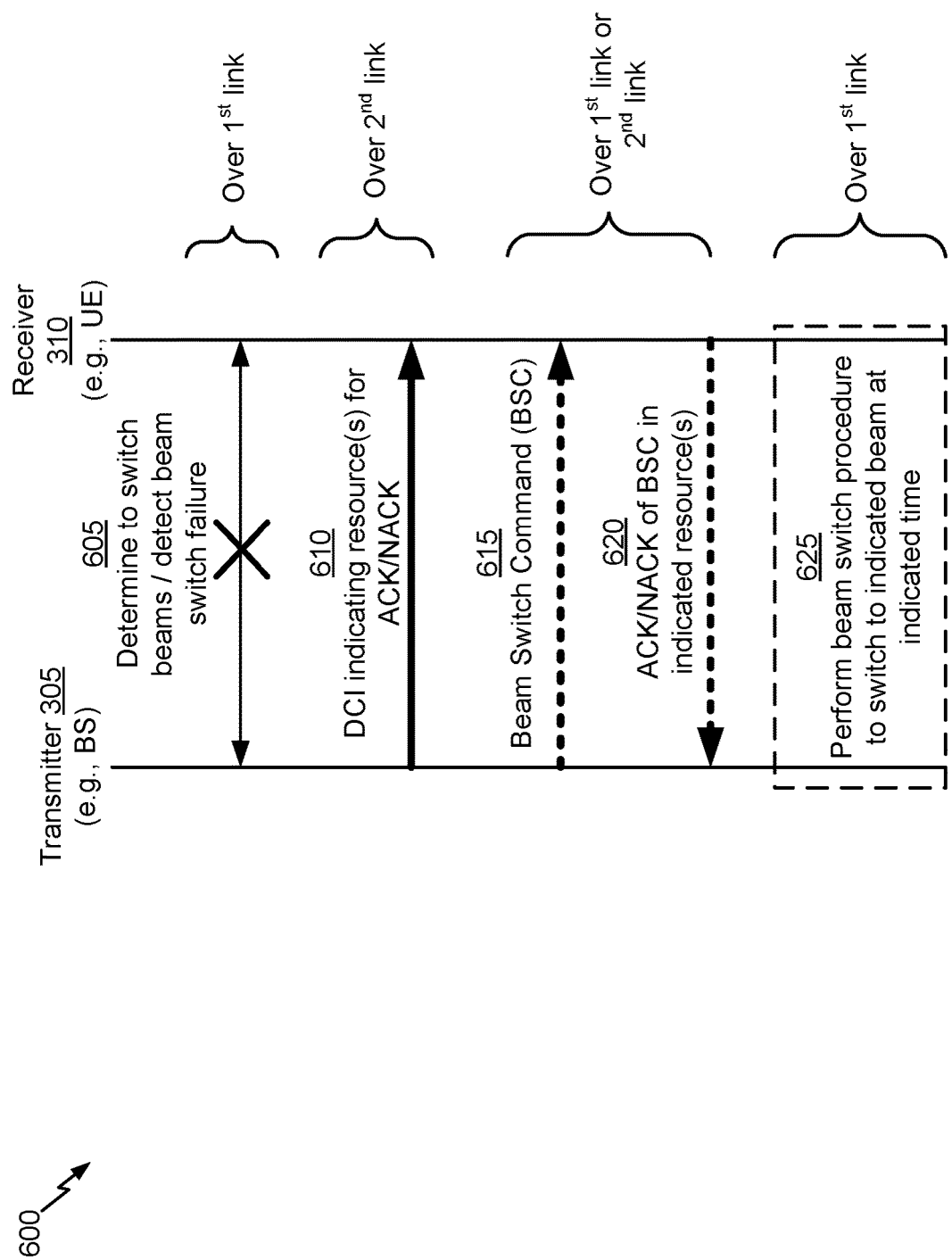

FIG. 6 is a diagram illustrating an example 600 relating to beam switching, in accordance with various aspects of the present disclosure.

As shown by reference number 605, a transmitter 305 may determine to switch beams on a first link between the transmitter 305 and a receiver 310, in a similar manner as described above in connection with FIG. 5.

As shown by reference number 610, the transmitter 305 may transmit, via the second link, DCI that indicates one or more resources for transmission of acknowledgement or negative acknowledgement (ACK/NACK) feedback corresponding to a beam switch command for the first link. The receiver 310 may receive the DCI via the second link. In some aspects, the one or more resources are one or more resources of the first link. In some aspects, the one or more resources are one or more resources of the second link.

As shown by reference number 615, the transmitter 305 may transmit, and the receiver 310 may receive, the beam switch command for the first link. As shown, the beam switch command may be communicated via the first link or the second link. Although example 600 shows the DCI as being communicated before the beam switch command, in some aspects, the beam switch command may be communicated before the DCI. In these cases, the beam switch command and the DCI may be included in different packets. Alternatively, the DCI and the beam switch command may be communicated together. In this case, the beam switch command and the DCI indicating the one or more resources for the ACK/NACK feedback may be included in the same packet.

As described elsewhere herein, the beam switch command may indicate a beam to be activated, a timing for activating the beam and/or performing the beam switch, and/or the like. Additionally, or alternatively, the beam switch command may include a first indication to switch from a first downlink beam pair to a second downlink beam pair on the first link, a second indication to switch from a first uplink beam pair to a second uplink beam pair on the first link, a third indication of a sequence of beam switches to be performed over a time period on the first link, a fourth indication to switch beam pairs for a point of a coordinated multipoint communication on the first link, and/or the like, as described in more detail below in connection with FIG. 7. In some aspects, the beam switch command may include information for negotiating a beam switch, as described in more detail below in connection with FIG. 8.

As shown by reference number 620, the receiver 310 may transmit, and the transmitter 305 may receive, ACK/NACK feedback, corresponding to the beam switch command, using the one or more resources indicated in the DCI communicated via the second link. As shown, the ACK/NACK feedback may be communicated via the first link or the second link. In some aspects, when the one or more resources are one or more resources of the first link, the ACK/NACK feedback is transmitted via the first link. In some aspects, when the one or more resources are one or more resources of the second link, the ACK/NACK feedback is transmitted via the second link.

In some aspects, the beam switch command and the ACK/NACK feedback are communicated via the same link. For example, the beam switch command and the ACK/NACK feedback may both be communicated via the first link. Alternatively, the beam switch command and the ACK/NACK feedback may both be communicated via the second link. In some aspects, the beam switch command and the ACK/NACK feedback are communicated via different links. For example, the beam switch command may be communicated via the first link, and the ACK/NACK feedback may be communicated via the second link. Alternatively, the beam switch command may be communicated via the second link, and the ACK/NACK feedback may be communicated via the first link.

As shown by reference number 625, the transmitter 305 and the receiver 310 may perform a beam switch procedure on the first link based at least in part on the beam switch command and/or the ACK/NACK feedback, in a similar manner as described above in connection with FIG. 5.

As described above, in some aspects, the first link uses a first frequency band and the second link uses a second frequency band. For example, the first frequency band may be a millimeter wave frequency band, and the second frequency band may be a sub-6 gigahertz frequency band. In this way, the DCI that indicates the one or more resources for the ACK/NACK feedback, the beam switch command, and/or the ACK/NACK feedback may be communicated via the second link with improved reliability as compared to the first link.

As indicated above, FIG. 6 is provided as an example. Other examples are possible and may differ from what was described with respect to FIG. 6.

Figure 7:
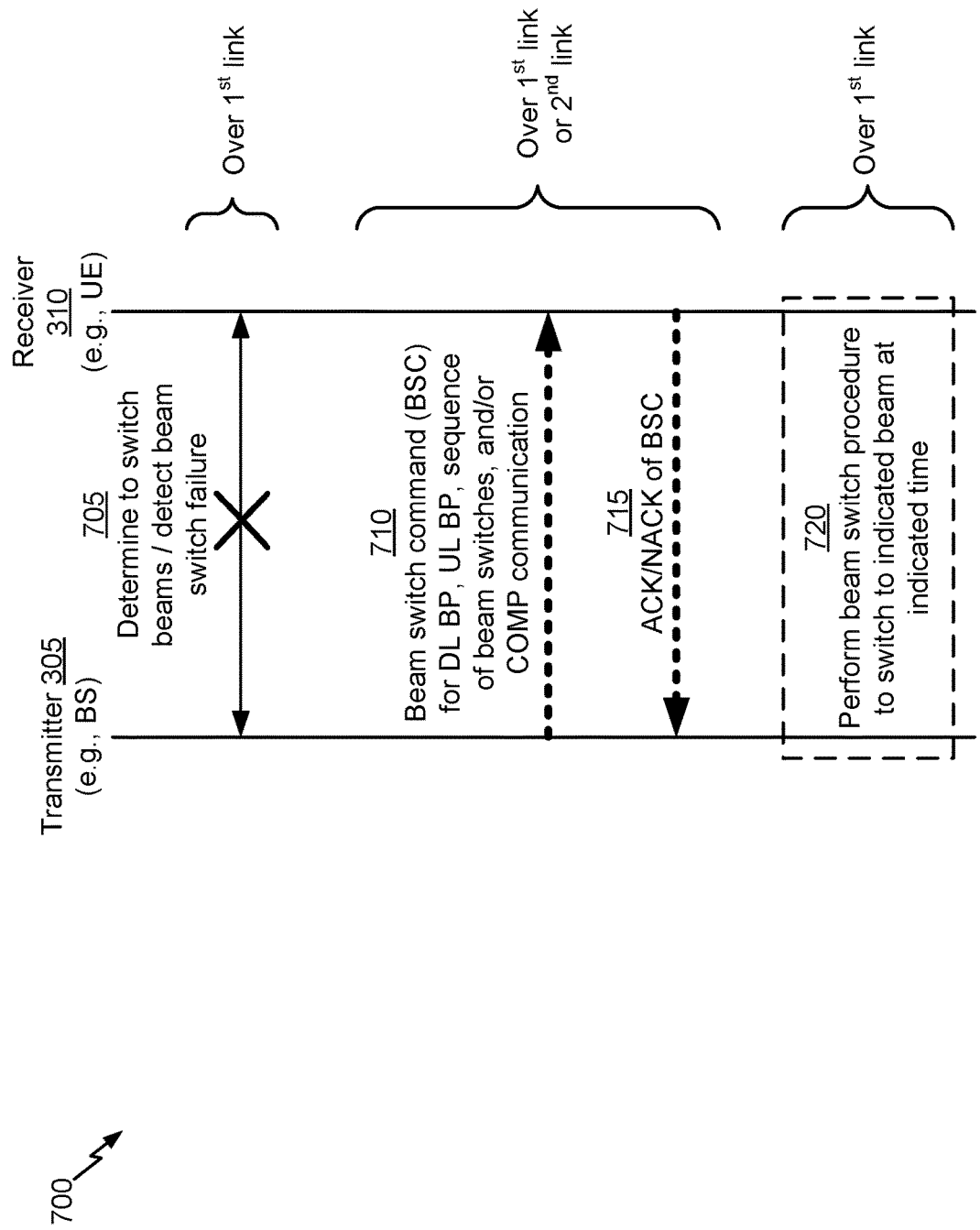

FIG. 7 is a diagram illustrating an example 700 relating to beam switching, in accordance with various aspects of the present disclosure.

As shown by reference number 705, a transmitter 305 may determine to switch beams on a first link between the transmitter 305 and a receiver 310, in a similar manner as described above in connection with FIG. 5.

As shown by reference number 710, the transmitter 305 may transmit, and the receiver 310 may receive, a beam switch command for the first link. As shown, the beam switch command may be communicated via the first link or the second link. In some aspects, the transmitter 305 may determine a link via which the beam switch command is to be transmitted based at least in part on a payload size of the beam switch command. For example, if the payload size of the beam switch command satisfies a threshold (e.g., is greater than or equal to the threshold), then the transmitter 305 may transmit the beam switch command via the second link (e.g., a sub-6 GHz link). As another example, if the payload size of the beam switch command does not satisfy a threshold (e.g., is less than or equal to the threshold), then the transmitter 305 may transmit the beam switch command via the first link (e.g., a millimeter wave link). In this way, resources on the first link may be conserved.

In some aspects, the beam switch command may indicate a beam to be activated, a timing for activating the beam and/or performing the beam switch, and/or the like. Additionally, or alternatively, the beam switch command may include a first indication to switch from a first downlink beam pair (e.g., shown as DL BP) to a second downlink beam pair on the first link, a second indication to switch from a first uplink beam pair (e.g., shown as UL BP) to a second uplink beam pair on the first link, a third indication of a sequence of beam switches to be performed over a time period on the first link, a fourth indication to switch beam pairs for a point of a coordinated multipoint (COMP) communication on the first link, and/or the like.

In some aspects, the beam switch command may include the first indication to switch from a first downlink beam pair to a second downlink beam pair on the first link, and may not include the second indication to switch from a first uplink beam pair to a second uplink beam pair on the first link. A downlink beam pair may include, for example, a transmitter (Tx) downlink beam and a receiver (Rx) downlink beam, which may be indicated by a Tx downlink beam index and an Rx downlink beam index, respectively. The Tx downlink beam may be used by the transmitter 305 (e.g., a base station 110) to transmit downlink communications to the receiver 310 (e.g., a UE 120), and the Rx downlink beam may be used by the receiver 310 to receive downlink communications from the transmitter 305. In some aspects, the Tx downlink beam and the Rx downlink beam may be referred to collectively as a downlink beam pair, a downlink beam pair link (BPL), and/or the like.

In some aspects, the beam switch command may include the second indication to switch from a first uplink beam pair to a second uplink beam pair on the first link, and may not include the first indication to switch from a first downlink beam pair to a second downlink beam pair on the first link. An uplink beam pair may include, for example, a transmitter (Tx) uplink beam and a receiver (Rx) uplink beam, which may be indicated by a Tx uplink beam index and an Rx uplink beam index, respectively. The Tx uplink beam may be used by the transmitter 305 (e.g., a base station 110) to receive uplink communications from the receiver 310 (e.g., a UE 120), and the Rx uplink beam may be used by the receiver 310 to transmit uplink communications to the transmitter 305. In some aspects, the Tx uplink beam and the Rx uplink beam may be referred to collectively as an uplink beam pair, an uplink beam pair link (BPL), and/or the like.

In some aspects, the beam switch command may include both the first indication and the second indication. In this way, the transmitter 305 and the receiver 310 may switch downlink beams without switching uplink beams, may switch uplink beams without switching downlink beams, or may switch both uplink beams and downlink beams, depending on network conditions. As an example, if a UE 120 is being blocked by a hand or other part of a human body, or is otherwise subject to a maximum permissible exposure (MPE) limitation, then the best downlink beam pair link may not be usable on the uplink. In this case, different beam pairs may be used on the uplink and the downlink.

In some aspects, the third indication of a sequence of beam switches to be performed over a time period may indicate to switch to a first beam pair for a first time period, to switch to a second beam pair for a second time period, to switch to a third beam pair for a third time period, and/or the like. In this way, the transmitter 305 and the receiver 310 may schedule beam hopping to increase diversity and lessen the impact of interference. In some aspects, the sequence of beam switches and/or an individual beam switch included in the sequence of beam switches may be for only a downlink beam pair. In some aspects, the sequence of beam switches and/or an individual beam switch included in the sequence of beam switches may be for only an uplink beam pair. In some aspects, the sequence of beam switches and/or an individual beam switch included in the sequence of beam switches may be for both a downlink beam pair and an uplink beam pair.

In some aspects, the fourth indication to switch beam pairs for a point of a coordinated multipoint (COMP) communication may be an indication to switch beam pairs for a cell, for an antenna subarray (e.g., a panel), and/or the like, to the receiver served by multiple points (e.g., transmission points and/or reception points) of a COMP system. In some aspects, the indication to switch beam pairs for a point of a COMP communication may be for only a downlink beam pair. In some aspects, the indication to switch beam pairs for a point of a COMP communication may be for only an uplink beam pair. In some aspects, the indication to switch beam pairs for a point of a COMP communication may be for both a downlink beam pair and an uplink beam pair.

In some aspects, the beam switch command may be a command to switch only a data beam. In some aspects, the beam switch command may be a command to switch only a control beam. In some aspects, the beam switch command may be a command to switch both a data beam and a control beam. In some aspects, the beam switch command may include information for negotiating a beam switch, as described in more detail below in connection with FIG. 8.

As shown by reference number 715, the receiver 310 may transmit, and the transmitter 305 may receive, ACK/NACK feedback corresponding to the beam switch command, in a similar manner as described above in connection with FIG. 5 and/or FIG. 6. As shown, the ACK/NACK feedback may be communicated via the first link or the second link.

As shown by reference number 720, the transmitter 305 and the receiver 310 may perform a beam switch procedure on the first link based at least in part on the beam switch command and/or the ACK/NACK feedback, in a similar manner as described above in connection with FIG. 5 and/or FIG. 6.

As described above, in some aspects, the first link uses a first frequency band and the second link uses a second frequency band. For example, the first frequency band may be a millimeter wave frequency band, and the second frequency band may be a sub-6 gigahertz frequency band. In this way, the beam switch command and/or the ACK/NACK feedback may be communicated via the second link with improved reliability as compared to the first link.

As indicated above, FIG. 7 is provided as an example. Other examples are possible and may differ from what was described with respect to FIG. 7.

Figure 8:
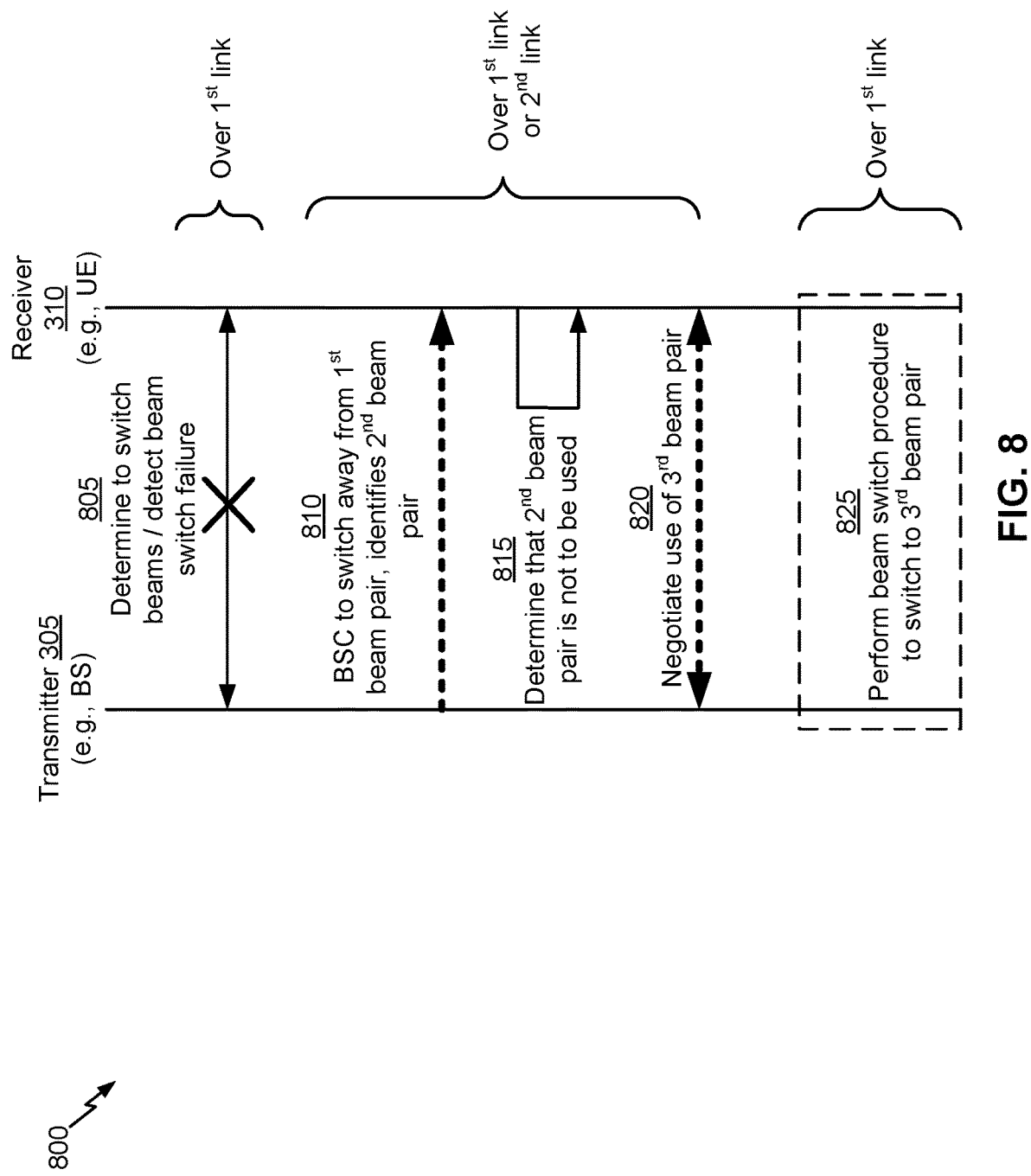

FIG. 8 is a diagram illustrating an example 800 relating to beam switching, in accordance with various aspects of the present disclosure.

As shown by reference number 805, a transmitter 305 may determine to switch beams on a first link between the transmitter 305 and a receiver 310, in a similar manner as described above in connection with FIG. 5.

As shown by reference number 810, the transmitter 305 may transmit, and the receiver 310 may receive, a beam switch command for the first link. As shown, the beam switch command may be communicated via the first link or the second link. In some aspects, the transmitter 305 and the receiver 310 may be communicating via a first beam pair (e.g., the first beam pair may be active), and the beam switch command may include a command to switch away from the first beam pair.

In some aspects, the beam switch command may identify a second beam pair. For example, the beam switch command may identify only the second beam pair, and may not identify any other beam pair. As another example, the beam switch command may identify a set of candidate beams, which may include the second beam pair, a third beam pair, and/or the like.

As shown by reference number 815, the receiver 310 may determine that the second beam pair is not to be used to communicate with the transmitter 305 (e.g., is not to be activated). For example, the receiver 310 may determine that the second beam pair is associated with a beam parameter (e.g., RSRP, RSRQ, RSSI, SINR, and/or the like) that does not satisfy a threshold. In some aspects, the receiver 310 may transmit, and the transmitter 305 may receive, an indication that the second beam pair is not to be used, e.g. based at least in part on SINR and/or another parameter falling below a threshold due to suddenly arrived interference at the corresponding Rx beam).

As shown by reference number 820, the transmitter 305 and the receiver 310 may negotiate use of a third beam pair that is to be activated. As shown, one or more communications associated with the negotiation may be communicated via the first link or the second link. In some aspects, the beam switch command may identify a plurality of candidate beams, which may include the second beam pair, the third beam pair, and/or the like. In this case, the receiver 310 may determine that the second beam pair is not to be used based on the latest measurement (e.g., based at least in part on a beam parameter of the second beam pair failing to satisfy a threshold), and may determine that the third beam pair is to be used (e.g., based at least in part on a beam parameter of the third beam pair satisfying a threshold). In some aspects, the set of candidate beams may be associated with a priority order (e.g., based at least in part on a measured beam parameter associated with each candidate beam). In some aspects, the third beam pair may be identified in the beam switch command as having a lower priority than the second beam pair (e.g. based at least in part on a measured RSRP in a previous report).

In some aspects, the receiver 310 may transmit, and the transmitter 305 may receive, an indication of the third beam pair. For example, the receiver 310 may transmit, and the transmitter 305 may receive, an ACK corresponding to the beam switch command, as described elsewhere herein. In some aspects, the ACK may include information identifying the third beam pair (e.g., based at least in part on a determination that the second beam pair is not to be used). In some aspects, the ACK is transmitted via the first link. In some aspects, the ACK is transmitted via the second link.

Additionally, or alternatively, the receiver 310 may transmit, and the transmitter 305 may receive, a rejection message indicating that the second beam pair has been rejected. In some aspects, the rejection message may identify the third beam pair (e.g., based at least in part on a beam scan performed by the receiver 310). The transmitter 305 may receive the rejection message, may verify that the third beam pair is to be used, and may transmit an indication, to the receiver 310, to use the third beam pair. In some aspects, the rejection message and/or the indication to use the third beam pair may be communicated via the first link. In some aspects, the rejection message may identify multiple candidate beam pairs (e.g., a third beam pair, a fourth beam pair, a fifth beam pair, etc.). The transmitter 305 may select a beam pair from the candidate beam pairs, and may indicate the selected beam pair to the receiver 310.

In some aspects, the rejection message may not identify a beam pair to be used. In this case, the transmitter 305 may obtain updated measurements of beam parameters for candidate beams, and may transmit, to the receiver 310, an indication of a beam to be activated based at least in part on obtaining the updated measurements. In some aspects, the rejection message and/or the indication to use the third beam pair may be communicated via the second link.

As shown by reference number 825, the transmitter 305 and the receiver 310 may perform a beam switch procedure to switch to the third beam pair (e.g., from the first beam pair to the third beam pair) on the first link based at least in part on determining that the second beam pair is not to be used, receiving the indication that the second beam pair is not to be used, and/or negotiating use of the third beam pair.

As described above, in some aspects, the first link uses a first frequency band and the second link uses a second frequency band. For example, the first frequency band may be a millimeter wave frequency band, and the second frequency band may be a sub-6 gigahertz frequency band. In this way, the beam switch command and/or the negotiation for the third beam pair may be communicated via the second link with improved reliability as compared to the first link. Furthermore, by negotiating a beam pair to be activated, the transmitter 305 and the receiver 310 may account for dynamic network conditions when selecting a beam to be activated, and may reduce a likelihood that a beam with poor parameters is selected using outdated measurements.

As indicated above, FIG. 8 is provided as an example. Other examples are possible and may differ from what was described with respect to FIG. 8.

Figure 9:
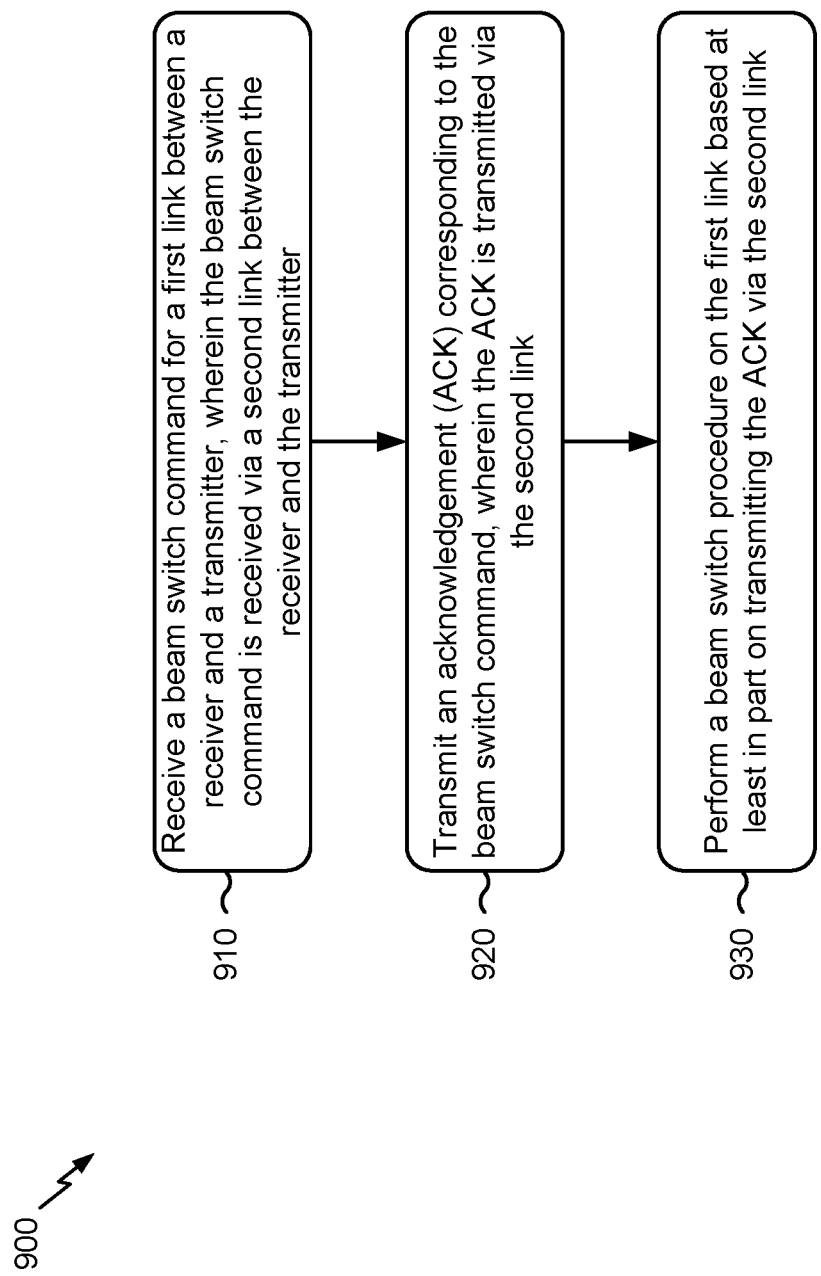
FIGS. 9-16 are diagrams illustrating an example process for beam switching, in accordance with various aspects of the present disclosure.

FIG. 9 is a diagram illustrating an example process 900 for beam switching, in accordance with various aspects of the present disclosure. Example process 900 is an example where a receiver (e.g., UE 120 and/or the like) performs beam switching.

As shown in FIG. 9, in some aspects, process 900 may include receiving a beam switch command for a first link between a receiver and a transmitter, wherein the beam switch command is received via a second link between the receiver and the transmitter (block 910). For example, the receiver may receive (e.g., using antenna 252, DEMOD 254, MIMO detector 256, receive processor 258, controller/processor 280, and/or the like) a beam switch command for a first link between a receiver and a transmitter, wherein the beam switch command is received via a second link between the receiver and the transmitter, as described above in connection with FIGS. 5-8.

As further shown in FIG. 9, in some aspects, process 900 may include transmitting an ACK corresponding to the beam switch command, wherein the ACK is transmitted via the second link (block 920). For example, the receiver may transmit (e.g., using controller/processor 280, transmit processor 264, TX MIMO processor 266, MOD 254, antenna 252, and/or the like) an ACK corresponding to the beam switch command, wherein the ACK is transmitted via the second link, as described above in connection with FIGS. 5-8.

As further shown in FIG. 9, in some aspects, process 900 may include performing a beam switch procedure on the first link based at least in part on transmitting the ACK via the second link (block 930). For example, the receiver may perform (e.g., using controller/processor 280 and/or the like) a beam switch procedure on the first link based at least in part on transmitting the ACK via the second link, as described above in connection with FIGS. 5-8.

Process 900 may include additional aspects, such as any single aspect or any combination of aspects described below.

In some aspects, the first link uses a first frequency band and the second link uses a second frequency band. In some aspects, the first frequency band is a millimeter wave frequency band and the second frequency band is a sub-6 gigahertz frequency band. In some aspects, the beam switch command is included in a radio resource control (RRC) configuration message, and the ACK acknowledges receipt of the RRC configuration message. In some aspects, the beam switch command is included in a media access control (MAC) control element of a packet, and the ACK acknowledges receipt of the packet.

In some aspects, the receiver may transmit a negative acknowledgement (NACK) corresponding to the beam switch command, wherein the NACK is transmitted via the second link; and may receive a retransmission of the beam switch command for the first link between the receiver and the transmitter, wherein the retransmission of the beam switch command is received via the second link between the receiver and the transmitter, and wherein the ACK corresponding to the beam switch command is transmitted based at least in part on receiving the retransmission of the beam switch command.

In some aspects, one or more resources for transmission of the ACK are scheduled based at least in part on downlink control information (DCI) received via the second link. In some aspects, the DCI is received in a same packet as the beam switch command. In some aspects, the DCI is received in a different packet than the beam switch command. In some aspects, the beam switch command includes at least one of: a first indication to switch from a first downlink beam pair to a second downlink beam pair, a second indication to switch from a first uplink beam pair to a second uplink beam pair, a third indication of a sequence of beam switches to be performed over a time period, a fourth indication to switch beam pairs for a point of a coordinated multipoint communication, or some combination thereof. In some aspects, the receiver is a user equipment. In some aspects, the transmitter is a base station.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
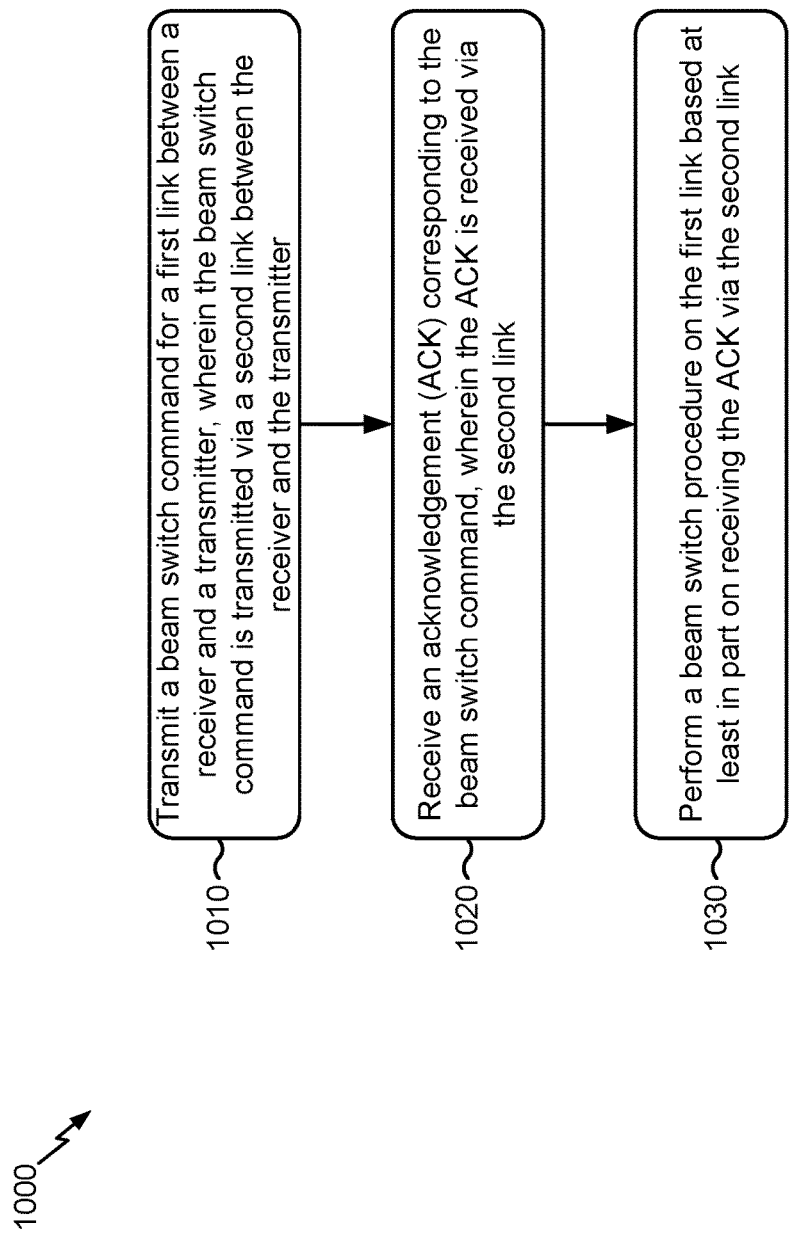

FIG. 10 is a diagram illustrating an example process 1000 for beam switching, in accordance with various aspects of the present disclosure. Example process 1000 is an example where a transmitter (e.g., base station 110 and/or the like) performs beam switching.

As shown in FIG. 10, in some aspects, process 1000 may include transmitting a beam switch command for a first link between a receiver and a transmitter, wherein the beam switch command is transmitted via a second link between the receiver and the transmitter (block 1010). For example, the transmitter may transmit (e.g., using controller/processor 240, transmit processor 220, TX MIMO processor 230, MOD 232, antenna 234, and/or the like) a beam switch command for a first link between a receiver and a transmitter, wherein the beam switch command is transmitted via a second link between the receiver and the transmitter, as described above in connection with FIGS. 5-8.

As further shown in FIG. 10, in some aspects, process 1000 may include receiving an acknowledgement (ACK) corresponding to the beam switch command, wherein the ACK is received via the second link (block 1020). For example, the transmitter may receive (e.g., using antenna 234, DEMOD 232, MIMO detector 236, receive processor 238, controller/processor 240, and/or the like) an acknowledgement (ACK) corresponding to the beam switch command, wherein the ACK is received via the second link, as described above in connection with FIGS. 5-8.

As further shown in FIG. 10, in some aspects, process 1000 may include performing a beam switch procedure on the first link based at least in part on transmitting the ACK via the second link (block 1030). For example, the transmitter may perform (e.g., using controller/processor 240 and/or the like) a beam switch procedure on the first link based at least in part on transmitting the ACK via the second link, as described above in connection with FIGS. 5-8.

Process 1000 may include additional aspects, such as any single aspect or any combination of aspects described below.

In some aspects, the first link uses a first frequency band and the second link uses a second frequency band. In some aspects, the first frequency band is a millimeter wave frequency band and the second frequency band is a sub-6 gigahertz frequency band. In some aspects, the beam switch command is included in a radio resource control (RRC) configuration message, and the ACK acknowledges receipt of the RRC configuration message. In some aspects, the beam switch command is included in a media access control (MAC) control element of a packet, and the ACK acknowledges receipt of the packet.

In some aspects, the transmitter may receive a negative acknowledgement (NACK) corresponding to the beam switch command, wherein the NACK is received via the second link; and may transmit a retransmission of the beam switch command for the first link between the receiver and the transmitter, wherein the retransmission of the beam switch command is transmitted via the second link between the receiver and the transmitter, and wherein the ACK corresponding to the beam switch command is received based at least in part on transmitting the retransmission of the beam switch command.

In some aspects, one or more resources for reception of the ACK are scheduled based at least in part on downlink control information (DCI) transmitted via the second link. In some aspects, the DCI is transmitted in a same packet as the beam switch command. In some aspects, the DCI is transmitted in a different packet than the beam switch command. In some aspects, the beam switch command includes at least one of: a first indication to switch from a first downlink beam pair to a second downlink beam pair, a second indication to switch from a first uplink beam pair to a second uplink beam pair, a third indication of a sequence of beam switches to be performed over a time period, a fourth indication to switch beam pairs for a point of a coordinated multipoint communication, or some combination thereof. In some aspects, the receiver is a user equipment. In some aspects, the transmitter is a base station.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
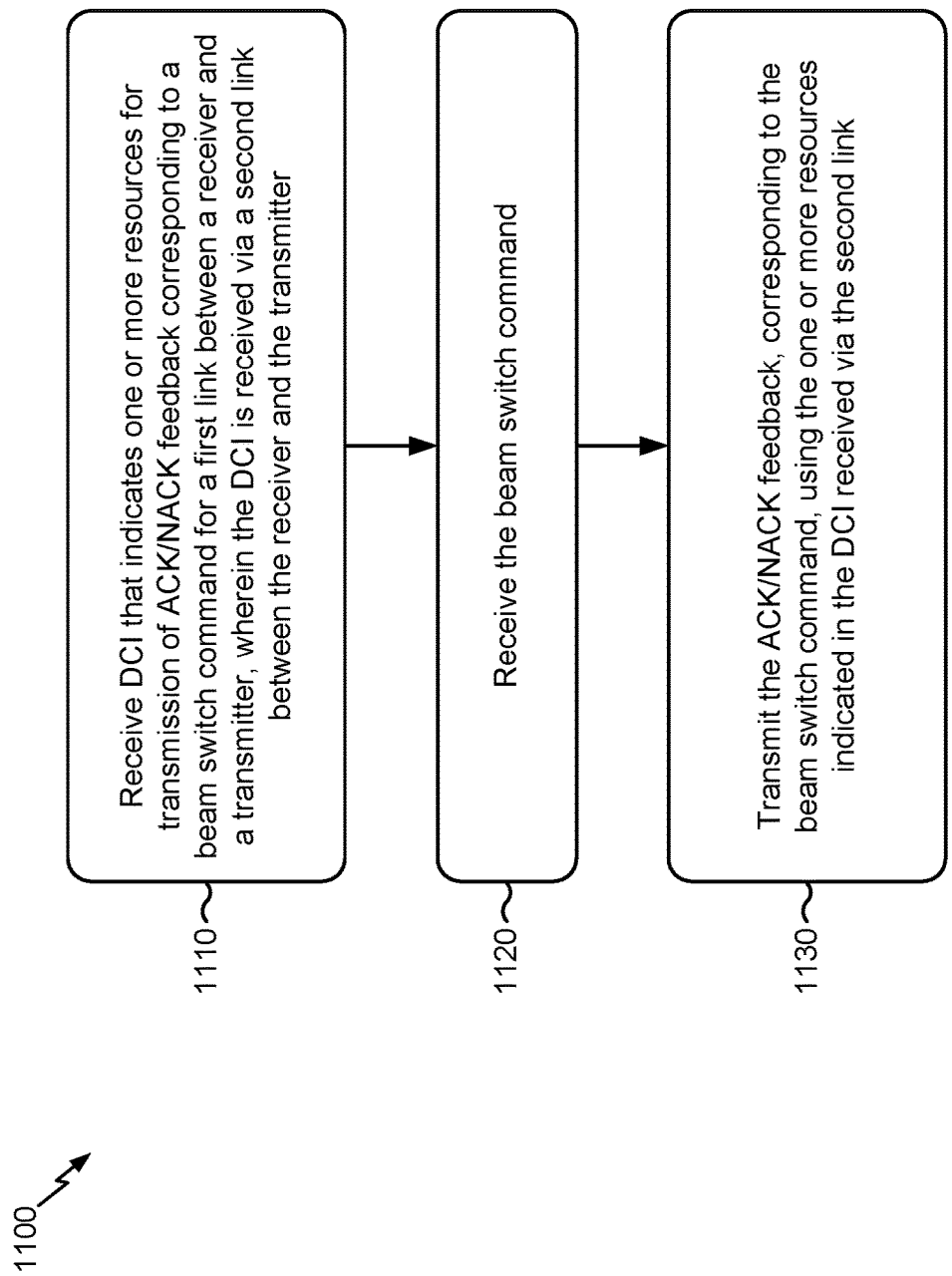

FIG. 11 is a diagram illustrating an example process 1100 for beam switching, in accordance with various aspects of the present disclosure. Example process 1100 is an example where a receiver (e.g., UE 120 and/or the like) performs beam switching.

As shown in FIG. 11, in some aspects, process 1100 may include receiving downlink control information (DCI) that indicates one or more resources for transmission of acknowledgement or negative acknowledgement (ACK/NACK) feedback corresponding to a beam switch command for a first link between a receiver and a transmitter, wherein the DCI is received via a second link between the receiver and the transmitter (block 1110). For example, the receiver may receive (e.g., using antenna 252, DEMOD 254, MIMO detector 256, receive processor 258, controller/processor 280, and/or the like) DCI that indicates one or more resources for transmission of ACK/NACK feedback corresponding to a beam switch command for a first link between a receiver and a transmitter, wherein the DCI is received via a second link between the receiver and the transmitter, as described above in connection with FIGS. 5-8.

As further shown in FIG. 11, in some aspects, process 1100 may include receiving the beam switch command (block 1120). For example, the receiver may receive (e.g., using antenna 252, DEMOD 254, MIMO detector 256, receive processor 258, controller/processor 280, and/or the like) the beam switch command, as described above in connection with FIGS. 5-8.

As further shown in FIG. 11, in some aspects, process 1100 may include transmitting the ACK/NACK feedback, corresponding to the beam switch command, using the one or more resources indicated in the DCI received via the second link (block 1130). For example, the receiver may transmit (e.g., using controller/processor 280, transmit processor 264, TX MIMO processor 266, MOD 254, antenna 252, and/or the like) the ACK/NACK feedback, corresponding to the beam switch command, using the one or more resources indicated in the DCI received via the second link, as described above in connection with FIGS. 5-8.

Process 1100 may include additional aspects, such as any single aspect or any combination of aspects described below.

In some aspects, the first link uses a first frequency band and the second link uses a second frequency band. In some aspects, the first frequency band is a millimeter wave frequency band and the second frequency band is a sub-6 gigahertz frequency band. In some aspects, the one or more resources are one or more resources of the first link, and the ACK/NACK feedback is transmitted via the first link. In some aspects, the one or more resources are one or more resources of the second link, and the ACK/NACK feedback is transmitted via the second link.

In some aspects, the beam switch command and the ACK/NACK feedback are communicated via a same one of the first link or the second link. In some aspects, the beam switch command and the ACK/NACK feedback are communicated via different links of the first link and the second link. In some aspects, the beam switch command is received via the first link. In some aspects, the beam switch command is received via the second link. In some aspects, the DCI is included in a same packet as the beam switch command. In some aspects, the DCI is included in a different packet than the beam switch command.

In some aspects, the receiver may perform a beam switch procedure on the first link based at least in part on transmitting the ACK/NACK feedback. In some aspects, the beam switch command includes at least one of: a first indication to switch from a first downlink beam pair to a second downlink beam pair, a second indication to switch from a first uplink beam pair to a second uplink beam pair, a third indication of a sequence of beam switches to be performed over a time period, a fourth indication to switch beam pairs for a point of a coordinated multipoint communication, or some combination thereof. In some aspects, the receiver is a user equipment. In some aspects, the transmitter is a base station.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
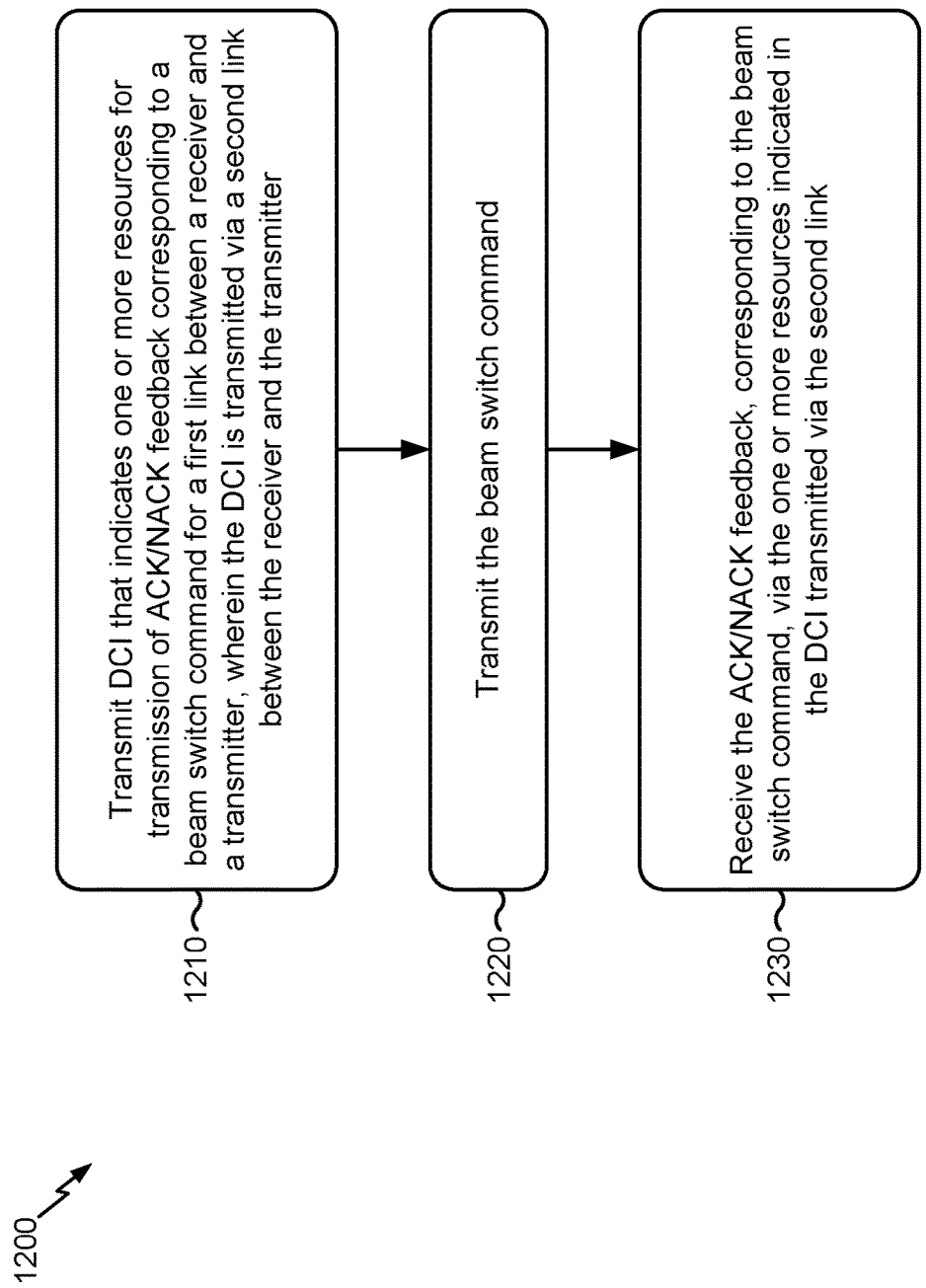

FIG. 12 is a diagram illustrating an example process 1200 for beam switching, in accordance with various aspects of the present disclosure. Example process 1200 is an example where a transmitter (e.g., base station 110 and/or the like) performs beam switching.

As shown in FIG. 12, in some aspects, process 1200 may include transmitting downlink control information (DCI) that indicates one or more resources for transmission of acknowledgement or negative acknowledgement (ACK/NACK) feedback corresponding to a beam switch command for a first link between a receiver and a transmitter, wherein the DCI is transmitted via a second link between the receiver and the transmitter (block 1210). For example, the transmitter may transmit (e.g., using controller/processor 240, transmit processor 220, TX MIMO processor 230, MOD 232, antenna 234, and/or the like) DCI that indicates one or more resources for transmission of ACK/NACK feedback corresponding to a beam switch command for a first link between a receiver and a transmitter, wherein the DCI is transmitted via a second link between the receiver and the transmitter, as described above in connection with FIGS. 5-8.

As further shown in FIG. 12, in some aspects, process 1200 may include transmitting the beam switch command (block 1220). For example, the transmitter may transmit (e.g., using controller/processor 240, transmit processor 220, TX MIMO processor 230, MOD 232, antenna 234, and/or the like) the beam switch command, as described above in connection with FIGS. 5-8.

As further shown in FIG. 12, in some aspects, process 1200 may include receiving the ACK/NACK feedback, corresponding to the beam switch command, via the one or more resources indicated in the DCI transmitted via the second link (block 1230). For example, the transmitter may receive (e.g., using antenna 234, DEMOD 232, MIMO detector 236, receive processor 238, controller/processor 240, and/or the like) the ACK/NACK feedback, corresponding to the beam switch command, via the one or more resources indicated in the DCI transmitted via the second link, as described above in connection with FIGS. 5-8.

Process 1200 may include additional aspects, such as any single aspect or any combination of aspects described below.

In some aspects, the first link uses a first frequency band and the second link uses a second frequency band. In some aspects, the first frequency band is a millimeter wave frequency band and the second frequency band is a sub-6 gigahertz frequency band. In some aspects, the one or more resources are one or more resources of the first link, and the ACK/NACK feedback is received via the first link. In some aspects, the one or more resources are one or more resources of the second link, and the ACK/NACK feedback is received via the second link.

In some aspects, the beam switch command and the ACK/NACK feedback are communicated via a same one of the first link or the second link. In some aspects, the beam switch command and the ACK/NACK feedback are communicated via different links of the first link and the second link. In some aspects, the beam switch command is transmitted via the first link. In some aspects, the beam switch command is transmitted via the second link. In some aspects, the DCI is included in a same packet as the beam switch command. In some aspects, the DCI is included in a different packet than the beam switch command.

In some aspects, the transmitter may perform a beam switch procedure on the first link based at least in part on receiving the ACK/NACK feedback. In some aspects, the beam switch command includes at least one of: a first indication to switch from a first downlink beam pair to a second downlink beam pair, a second indication to switch from a first uplink beam pair to a second uplink beam pair, a third indication of a sequence of beam switches to be performed over a time period, a fourth indication to switch beam pairs for a point of a coordinated multipoint communication, or some combination thereof. In some aspects, the receiver is a user equipment. In some aspects, the transmitter is a base station.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
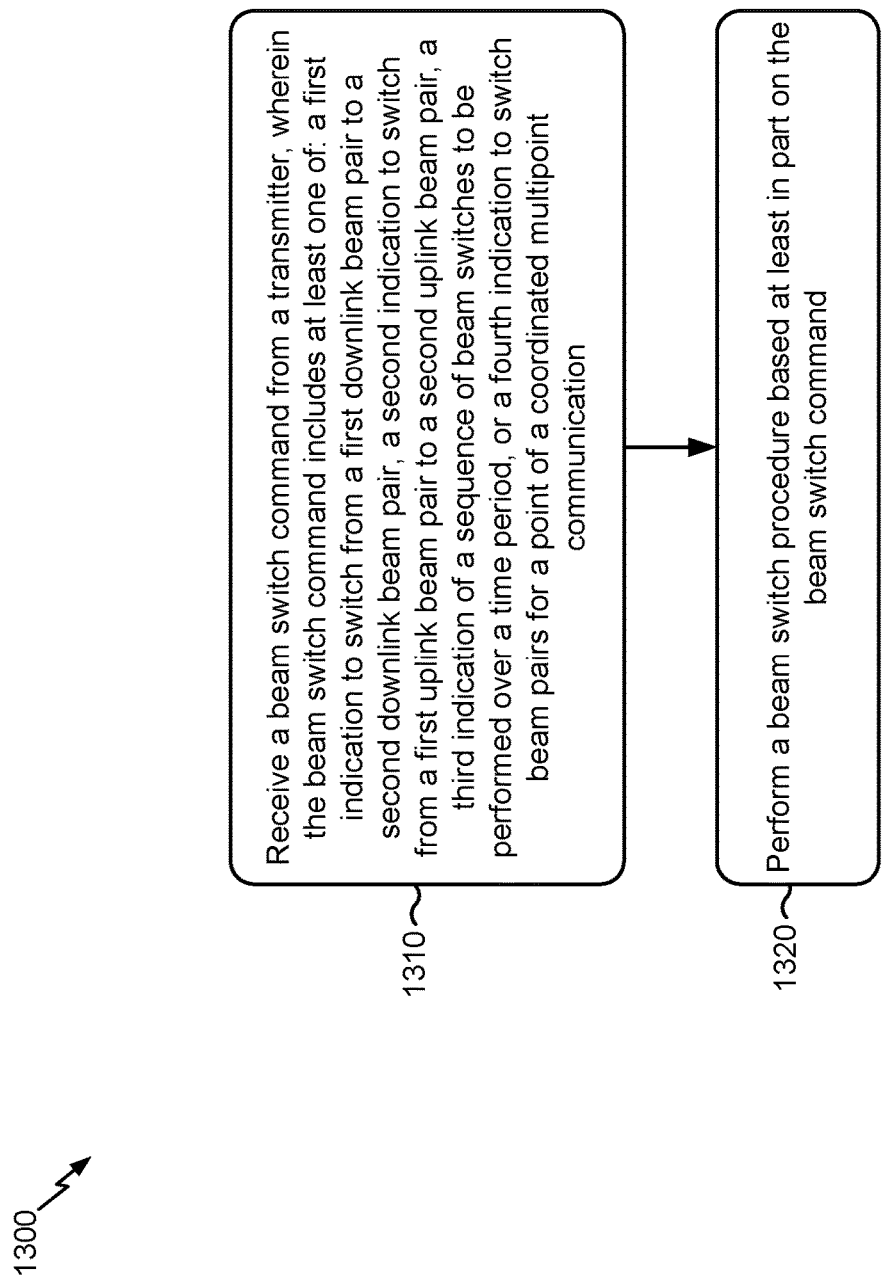

FIG. 13 is a diagram illustrating an example process 1300 for beam switching, in accordance with various aspects of the present disclosure. Example process 1300 is an example where a receiver (e.g., UE 120 and/or the like) performs beam switching.

As shown in FIG. 13, in some aspects, process 1300 may include receiving a beam switch command from a transmitter, wherein the beam switch command includes at least one of: a first indication to switch from a first downlink beam pair to a second downlink beam pair, a second indication to switch from a first uplink beam pair to a second uplink beam pair, a third indication of a sequence of beam switches to be performed over a time period, or a fourth indication to switch beam pairs for a point of a coordinated multipoint communication (block 1310). For example, the receiver may receive (e.g., using antenna 252, DEMOD 254, MIMO detector 256, receive processor 258, controller/processor 280, and/or the like) a beam switch command from a transmitter, wherein the beam switch command includes at least one of: a first indication to switch from a first downlink beam pair to a second downlink beam pair, a second indication to switch from a first uplink beam pair to a second uplink beam pair, a third indication of a sequence of beam switches to be performed over a time period, or a fourth indication to switch beam pairs for a point of a coordinated multipoint communication, as described above in connection with FIGS. 5-8.

As further shown in FIG. 13, in some aspects, process 1300 may include performing a beam switch procedure based at least in part on the beam switch command (block 1320). For example, the receiver may perform (e.g., using controller/processor 280 and/or the like) a beam switch procedure based at least in part on the beam switch command, as described above in connection with FIGS. 5-8.

Process 1300 may include additional aspects, such as any single aspect or any combination of aspects described below.

In some aspects, the third indication indicates to switch to a first beam pair for a first time period and a second beam pair for a second time period. In some aspects, the point of the coordinated multipoint communication includes at least one of: a cell, an antenna subarray, or some combination thereof. In some aspects, the fourth indication includes at least one of: an indication to switch a downlink beam pair, an indication to switch an uplink beam pair, or some combination thereof.

In some aspects, the beam switch command is for at least one of: a data beam, a control beam, or some combination thereof. In some aspects, the beam switch command is a command for a first link between the receiver and the transmitter, and the beam switch command is received via the first link. In some aspects, the beam switch command is a command for a first link between the receiver and the transmitter, and the beam switch command is received via a second link between the receiver and the transmitter. In some aspects, the first link uses a millimeter wave frequency band and the second link uses a sub-6 gigahertz frequency band. In some aspects, the receiver is a user equipment. In some aspects, the transmitter is a base station.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
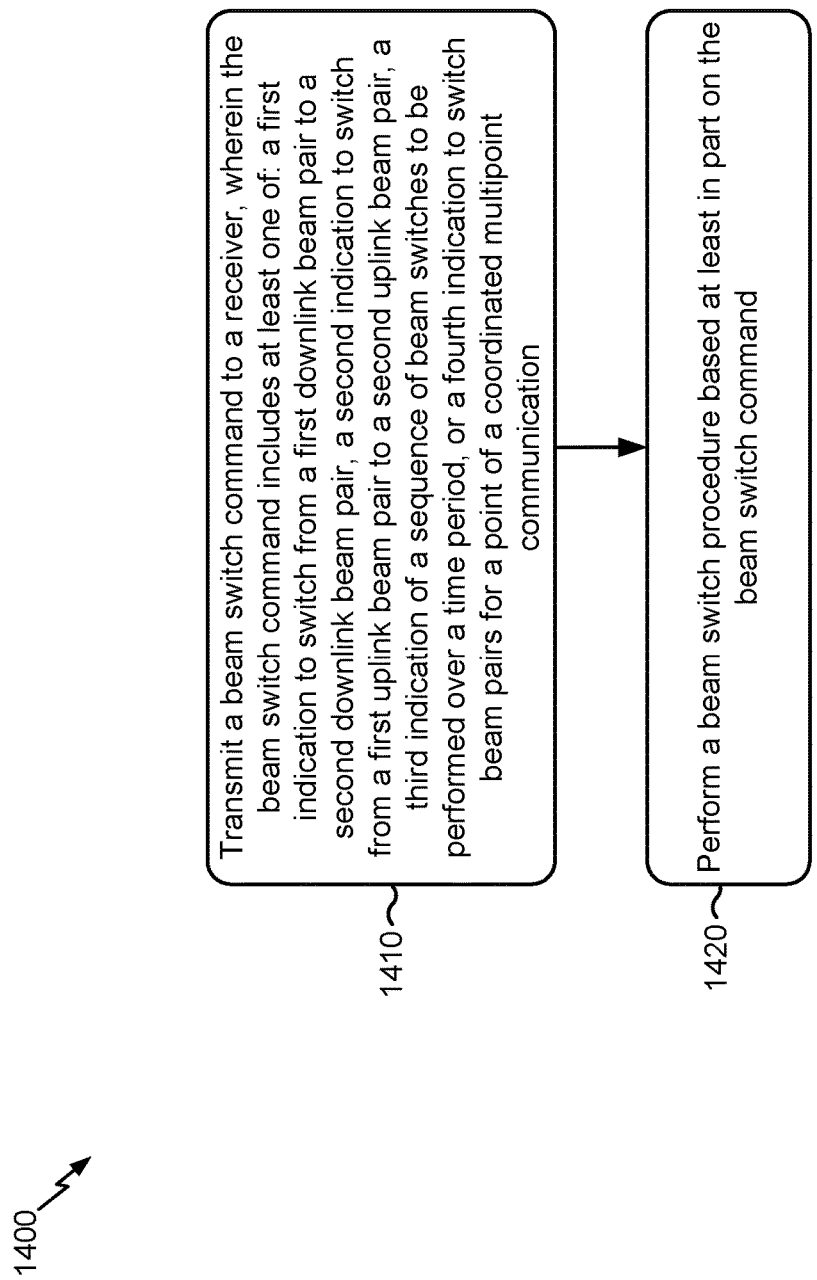

FIG. 14 is a diagram illustrating an example process 1400 for beam switching, in accordance with various aspects of the present disclosure. Example process 1400 is an example where a transmitter (e.g., base station 110 and/or the like) performs beam switching.

As shown in FIG. 14, in some aspects, process 1400 may transmitting a beam switch command, wherein the beam switch command includes at least one of: a first indication to switch from a first downlink beam pair to a second downlink beam pair, a second indication to switch from a first uplink beam pair to a second uplink beam pair, a third indication of a sequence of beam switches to be performed over a time period, or a fourth indication to switch beam pairs for a point of a coordinated multipoint communication (block 1410). For example, the transmitter may transmit (e.g., using controller/processor 240, transmit processor 220, TX MIMO processor 230, MOD 232, antenna 234, and/or the like) a beam switch command, wherein the beam switch command includes at least one of: a first indication to switch from a first downlink beam pair to a second downlink beam pair, a second indication to switch from a first uplink beam pair to a second uplink beam pair, a third indication of a sequence of beam switches to be performed over a time period, or a fourth indication to switch beam pairs for a point of a coordinated multipoint communication, as described above in connection with FIGS. 5-8.

As further shown in FIG. 14, in some aspects, process 1400 may include performing a beam switch procedure based at least in part on the beam switch command (block 1420). For example, the transmitter may perform (e.g., using controller/processor 240 and/or the like) a beam switch procedure based at least in part on the beam switch command, as described above in connection with FIGS. 5-8.

Process 1400 may include additional aspects, such as any single aspect or any combination of aspects described below.

In some aspects, the third indication indicates to switch to a first beam pair for a first time period and a second beam pair for a second time period. In some aspects, the point of the coordinated multipoint communication includes at least one of: a cell, an antenna subarray, or some combination thereof. In some aspects, the fourth indication includes at least one of: an indication to switch a downlink beam pair, an indication to switch an uplink beam pair, or some combination thereof.

In some aspects, the beam switch command is for at least one of: a data beam, a control beam, or some combination thereof. In some aspects, the beam switch command is a command for a first link between the receiver and the transmitter, and the beam switch command is transmitted via the first link. In some aspects, the beam switch command is a command for a first link between the receiver and the transmitter, and the beam switch command is transmitted via a second link between the receiver and the transmitter. In some aspects, the first link uses a millimeter wave frequency band and the second link uses a sub-6 gigahertz frequency band. In some aspects, the receiver is a user equipment. In some aspects, the transmitter is a base station.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
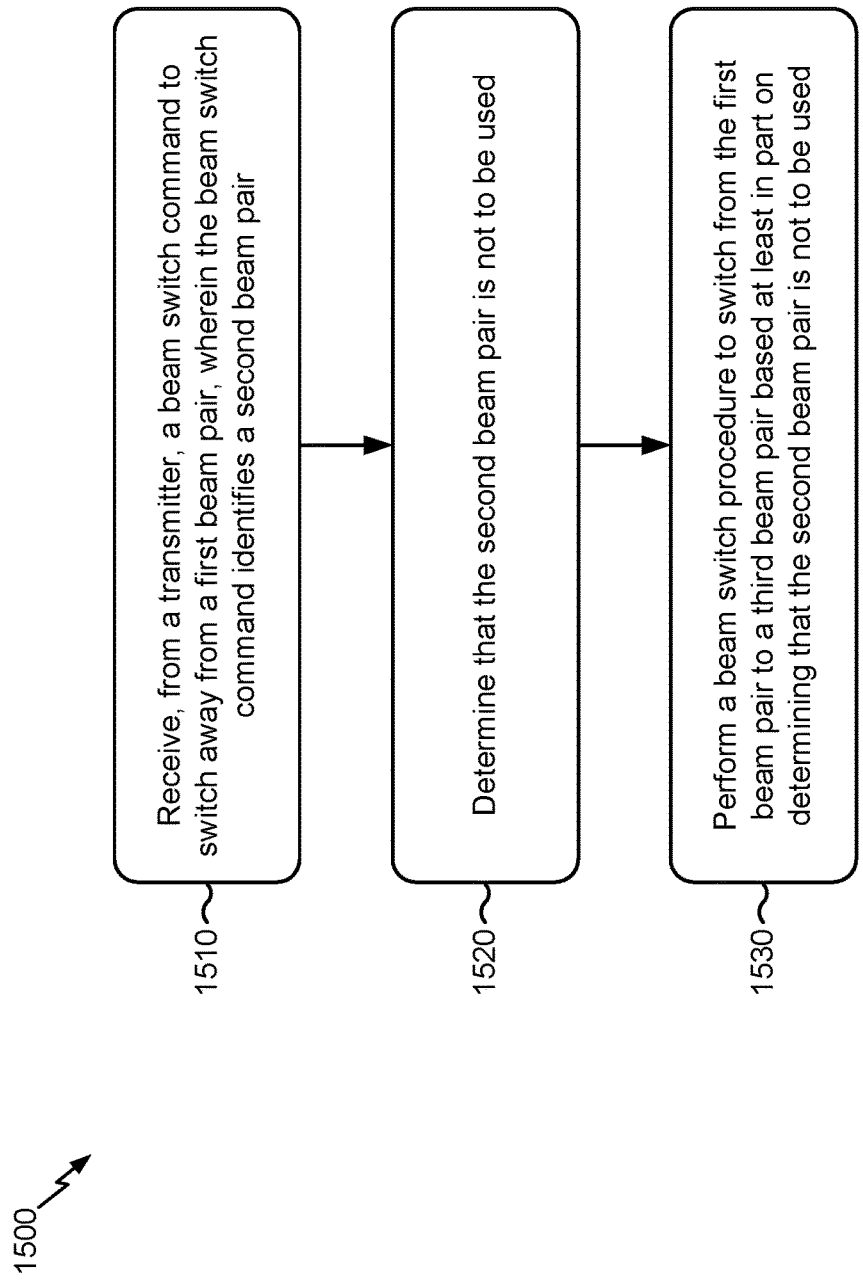

FIG. 15 is a diagram illustrating an example process 1500 for beam switching, in accordance with various aspects of the present disclosure. Example process 1500 is an example where a receiver (e.g., UE 120 and/or the like) performs beam switching.

As shown in FIG. 15, in some aspects, process 1500 may include receiving, from a transmitter, a beam switch command to switch away from a first beam pair, wherein the beam switch command identifies a second beam pair (block

1510). For example, the receiver may receive (e.g., using antenna 252, DEMOD 254, MIMO detector 256, receive processor 258, controller/processor 280, and/or the like), from a transmitter, a beam switch command to switch away from a first beam pair, wherein the beam switch command identifies a second beam pair, as described above in connection with FIGS. 5-8.

As further shown in FIG. 15, in some aspects, process 1500 may include determining that the second beam pair is not to be used (block 1520). For example, the receiver may determine (e.g., using controller/processor 280 and/or the like) that the second beam pair is not to be used, as described above in connection with FIGS. 5-8.

As further shown in FIG. 15, in some aspects, process 1500 may include performing a beam switch procedure to switch from the first beam pair to a third beam pair based at least in part on determining that the second beam pair is not to be used (block 1530). For example, the receiver may perform (e.g., using controller/processor 280 and/or the like) a beam switch procedure to switch from the first beam pair to a third beam pair based at least in part on determining that the second beam pair is not to be used, as described above in connection with FIGS. 5-8.

Process 1500 may include additional aspects, such as any single aspect or any combination of aspects described below.

In some aspects, the beam switch command is a command for a first link between the receiver and the transmitter, and the beam switch command is received via a second link between the receiver and the transmitter. In some aspects, the first link uses a millimeter wave frequency band and the second link uses a sub-6 gigahertz frequency band.

In some aspects, the beam switch command includes information identifying a plurality of candidate beam pairs, wherein the plurality of candidate beam pairs includes the second beam pair and the third beam pair. In some aspects, the receiver may transmit an acknowledgement (ACK) corresponding to the beam switch command, wherein the ACK includes information identifying the third beam pair.

In some aspects, the third beam pair is identified in the beam switch command as having a lower priority than the second beam pair. In some aspects, the receiver may transmit an acknowledgement (ACK) corresponding to the beam switch command, wherein the third beam pair is identified in the ACK based at least in part on determining that the second beam pair is not to be used.

In some aspects, the receiver may transmit a rejection message indicating that the second beam pair has been rejected. In some aspects, the beam switch command is a command for a first link between the receiver and the transmitter, and the rejection message is transmitted via a second link between the receiver and the transmitter. In some aspects, the rejection message identifies the third beam pair. In some aspects, the receiver may receive an indication to use the third beam pair based at least in part on transmitting the rejection message. In some aspects, the receiver is a user equipment. In some aspects, the transmitter is a base station.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
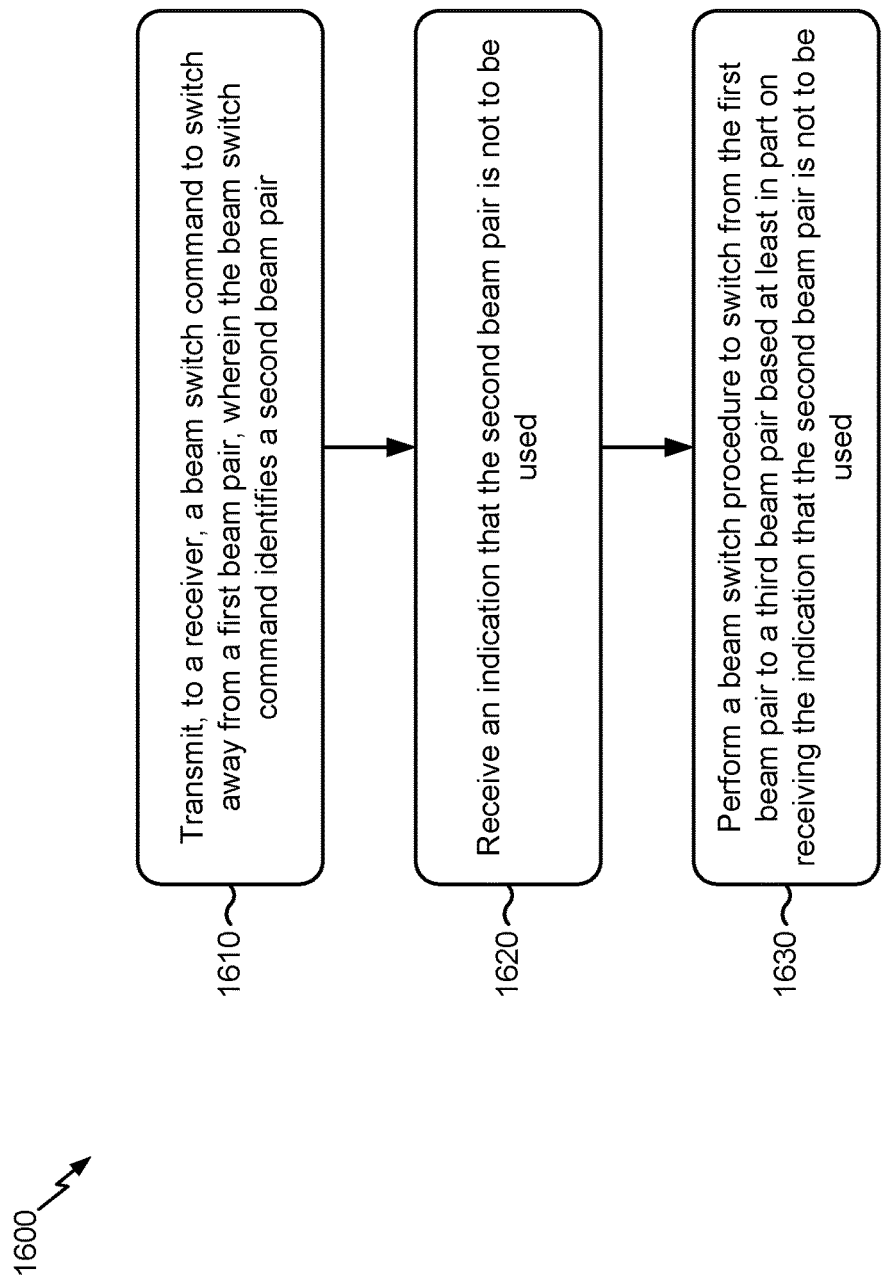

FIG. 16 is a diagram illustrating an example process 1600 for beam switching, in accordance with various aspects of the present disclosure. Example process 1600 is an example where a transmitter (e.g., base station 110 and/or the like) performs beam switching.

As shown in FIG. 16, in some aspects, process 1600 may include transmitting, to a receiver, a beam switch command to switch away from a first beam pair, wherein the beam switch command identifies a second beam pair (block 1610). For example, the transmitter may transmit (e.g., using controller/processor 240, transmit processor 220, TX MIMO processor 230, MOD 232, antenna 234, and/or the like), to a receiver, a beam switch command to switch away from a first beam pair, wherein the beam switch command identifies a second beam pair, as described above in connection with FIGS. 5-8.

As further shown in FIG. 16, in some aspects, process 1600 may include receiving an indication that the second beam pair is not to be used (block 1620). For example, the transmitter may receive (e.g., using antenna 234, DEMOD 232, MIMO detector 236, receive processor 238, controller/processor 240, and/or the like) an indication that the second beam pair is not to be used, as described above in connection with FIGS. 5-8.

As further shown in FIG. 16, in some aspects, process 1600 may include performing a beam switch procedure to switch from the first beam pair to a third beam pair based at least in part on receiving the indication that the second beam pair is not to be used (block 1630). For example, the transmitter may perform (e.g., using controller/processor 240 and/or the like) a beam switch procedure to switch from the first beam pair to a third beam pair based at least in part on receiving the indication that the second beam pair is not to be used, as described above in connection with FIGS. 5-8.

Process 1600 may include additional aspects, such as any single aspect or any combination of aspects described below.

In some aspects, the beam switch command is a command for a first link between the receiver and the transmitter, and the beam switch command is transmitted via a second link between the receiver and the transmitter. In some aspects, the first link uses a millimeter wave frequency band and the second link uses a sub-6 gigahertz frequency band.

In some aspects, the beam switch command includes information identifying a plurality of candidate beam pairs, wherein the plurality of candidate beam pairs includes the second beam pair and the third beam pair. In some aspects, the transmitter may receive an acknowledgement (ACK) corresponding to the beam switch command, wherein the ACK includes information identifying the third beam pair.

In some aspects, the third beam pair is identified in the beam switch command as having a lower priority than the second beam pair. In some aspects, the transmitter may receive an acknowledgement (ACK) corresponding to the beam switch command, wherein the third beam pair is identified in the ACK.

In some aspects, the transmitter may receive a rejection message indicating that the second beam pair has been rejected. In some aspects, the beam switch command is a command for a first link between the receiver and the transmitter, and the rejection message is received via a second link between the receiver and the transmitter. In some aspects, the rejection message identifies the third beam pair. In some aspects, the transmitter may transmit an indication to use the third beam pair based at least in part on receiving the rejection message. In some aspects, the receiver is a user equipment. In some aspects, the transmitter is a base station.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a receiver, comprising:
   receiving a beam switch command for a first link between the receiver and a transmitter via a second link between the receiver and the transmitter, wherein the first link and the second link use different frequency bands;
   transmitting an acknowledgement (ACK) corresponding to the beam switch command via the second link; and
   performing a beam switch procedure on the first link based at least in part on transmitting the ACK via the second link, wherein the beam switch procedure comprises switching from a first beam to a second beam.

2. The method of claim 1, wherein the beam switch command is included in a radio resource control (RRC) configuration message or a media access control (MAC) control element of a packet, and wherein the ACK acknowledges receipt of the RRC configuration message or the packet.

3. The method of claim 1, further comprising:
   transmitting a negative acknowledgement (NACK) corresponding to the beam switch command, wherein the NACK is transmitted via the second link; and
   receiving a retransmission of the beam switch command for the first link between the receiver and the transmitter, wherein the retransmission of the beam switch command is received via the second link between the receiver and the transmitter,
   wherein the ACK corresponding to the beam switch command is transmitted based at least in part on receiving the retransmission of the beam switch command.

4. The method of claim 1, wherein one or more resources for transmission of the ACK are scheduled based at least in part on downlink control information (DCI) received via the second link.

5. The method of claim 4, wherein the DCI is received in one of:
   a same packet as the beam switch command, or
   a different packet than the beam switch command.

6. The method of claim 1, wherein the beam switch command includes at least one of:
   a first indication to switch from a first downlink beam pair to a second downlink beam pair,
   a second indication to switch from a first uplink beam pair to a second uplink beam pair,
   a third indication of a sequence of beam switches to be performed over a time period, or
   a fourth indication to switch beam pairs for a point of a coordinated multipoint communication.

7. The method of claim 1, wherein the second link does not use beams.

8. The method of claim 1,
   wherein the beam switch procedure comprises switching from a first beam pair to a second beam pair on the first link,
   wherein the first beam pair comprises the first beam, and
   wherein the second beam pair comprises the second beam.

9. A receiver for wireless communication, comprising:
   a memory; and
   one or more processors operatively coupled to the memory, the memory and the one or more processors configured to:
   receive a beam switch command for a first link between the receiver and a transmitter via a second link between the receiver and the transmitter, wherein the first link and the second link use different frequency bands;
   transmit an acknowledgement (ACK) corresponding to the beam switch command via the second link; and perform a beam switch procedure on the first link based at least in part on transmitting the ACK via the second link, wherein the beam switch procedure comprises switching from a first beam to a second beam.

10. The receiver of claim 9, wherein the beam switch command is included in a radio resource control (RRC) configuration message or a media access control (MAC) control element of a packet, and wherein the ACK acknowledges receipt of the RRC configuration message or the packet.

11. The receiver of claim 9, wherein the one or more processors are further configured to:
transmit a negative acknowledgement (NACK) corresponding to the beam switch command, wherein the NACK is transmitted via the second link; and
receive a retransmission of the beam switch command for the first link between the receiver and the transmitter, wherein the retransmission of the beam switch command is received via the second link between the receiver and the transmitter,
wherein the ACK corresponding to the beam switch command is transmitted based at least in part on receiving the retransmission of the beam switch command.

12. The receiver of claim 9, wherein one or more resources for transmission of the ACK are scheduled based at least in part on downlink control information (DCI) received via the second link.

13. The receiver of claim 9, wherein the beam switch command includes at least one of:
a first indication to switch from a first downlink beam pair to a second downlink beam pair,
a second indication to switch from a first uplink beam pair to a second uplink beam pair,
a third indication of a sequence of beam switches to be performed over a time period, or
a fourth indication to switch beam pairs for a point of a coordinated multipoint communication.

14. The receiver of claim 9, wherein the second link does not use beams.

15. A non-transitory computer-readable medium storing one or more instructions for wireless communication, the one or more instructions comprising:
one or more instructions that, when executed by one or more processors of a receiver, cause the one or more processors to:
receive a beam switch command for a first link between the receiver and a transmitter via a second link between the receiver and the transmitter, wherein the first link and the second link use different frequency bands;
transmit an acknowledgement (ACK) corresponding to the beam switch command via the second link; and
perform a beam switch procedure on the first link based at least in part on transmitting the ACK via the second link, wherein the beam switch procedure comprises switching from a first beam to a second beam.

16. The non-transitory computer-readable medium of claim 15, wherein the beam switch command is included in a radio resource control (RRC) configuration message or a media access control (MAC) control element of a packet, and wherein the ACK acknowledges receipt of the RRC configuration message or the packet.

17. The non-transitory computer-readable medium of claim 15, wherein the one or more instructions, when executed by the one or more processors, further cause the one or more processors to:
transmit a negative acknowledgement (NACK) corresponding to the beam switch command, wherein the NACK is transmitted via the second link; and
receive a retransmission of the beam switch command for the first link between the receiver and the transmitter, wherein the retransmission of the beam switch command is received via the second link between the receiver and the transmitter,
wherein the ACK corresponding to the beam switch command is transmitted based at least in part on receiving the retransmission of the beam switch command.

18. The non-transitory computer-readable medium of claim 15, wherein one or more resources for transmission of the ACK are scheduled based at least in part on downlink control information (DCI) received via the second link.

19. The non-transitory computer-readable medium of claim 18, wherein the DCI is received in one of:
a same packet as the beam switch command, or
a different packet than the beam switch command.

20. The non-transitory computer-readable medium of claim 15, wherein the beam switch command includes at least one of:
a first indication to switch from a first downlink beam pair to a second downlink beam pair,
a second indication to switch from a first uplink beam pair to a second uplink beam pair,
a third indication of a sequence of beam switches to be performed over a time period, or
a fourth indication to switch beam pairs for a point of a coordinated multipoint communication.

21. The non-transitory computer-readable medium of claim 15, wherein the second link does not use beams.

22. An apparatus for wireless communication, comprising:
means for receiving a beam switch command for a first link between the apparatus and a transmitter via a second link between the apparatus and the transmitter, wherein the first link and the second link use different frequency bands;
means for transmitting an acknowledgement (ACK) corresponding to the beam switch command via the second link; and
means for performing a beam switch procedure on the first link based at least in part on transmitting the ACK via the second link, wherein the beam switch procedure comprises switching from a first beam to a second beam.

23. The apparatus of claim 22, wherein the beam switch command is included in a radio resource control (RRC) configuration message or a media access control (MAC) control element of a packet, and wherein the ACK acknowledges receipt of the RRC configuration message or the packet.

24. The apparatus of claim 22, further comprising:
means for transmitting a negative acknowledgement (NACK) corresponding to the beam switch command, wherein the NACK is transmitted via the second link; and
means for receiving a retransmission of the beam switch command for the first link between the apparatus and the transmitter, wherein the retransmission of the beam switch command is received via the second link between the apparatus and the transmitter, wherein the ACK corresponding to the beam switch command is transmitted based at least in part on receiving the retransmission of the beam switch command.

25. The apparatus of claim 22, wherein one or more resources for transmission of the ACK are scheduled based at least in part on downlink control information (DCI) received via the second link.

26. The apparatus of claim 25, wherein the DCI is received in one of:
a same packet as the beam switch command, or
a different packet than the beam switch command.

27. The apparatus of claim 22, wherein the beam switch command includes at least one of:
a first indication to switch from a first downlink beam pair to a second downlink beam pair,
a second indication to switch from a first uplink beam pair to a second uplink beam pair,
a third indication of a sequence of beam switches to be performed over a time period, or
a fourth indication to switch beam pairs for a point of a coordinated multipoint communication.

28. The apparatus of claim 22, wherein the second link does not use beams.

29. The apparatus of claim 22,
wherein the first link is a millimeter wave link, and
wherein the second link is a sub-6 GHz link.

30. The apparatus of claim 22,
wherein the beam switch procedure comprises switching from a first beam pair to a second beam pair on the first link,
wherein the first beam pair comprises the first beam, and
wherein the second beam pair comprises the second beam.

* * * * *